(12) United States Patent
Arbore et al.

(10) Patent No.: US 12,292,597 B2
(45) Date of Patent: May 6, 2025

(54) LIGHT OUTPUT DEVICES AND LIGHT OUTPUTTING METHODS FOR OPTICAL SYSTEMS

(71) Applicant: Apple Inc., Cupertino, CA (US)

(72) Inventors: Mark A. Arbore, Los Altos, CA (US); Mohsen Kamandar Dezfouli, San Jose, CA (US); Yongming Tu, Redwood City, CA (US); Jeremy D. Witmer, San Jose, CA (US); Huiyang Deng, San Jose, CA (US); Alfredo Bismuto, Sunnyvale, CA (US); Petr Markov, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 141 days.

(21) Appl. No.: 17/949,096

(22) Filed: Sep. 20, 2022

(65) Prior Publication Data
US 2024/0094466 A1    Mar. 21, 2024

Related U.S. Application Data

(60) Provisional application No. 63/247,526, filed on Sep. 23, 2021.

(51) Int. Cl.
*G02B 6/12* (2006.01)
*G02B 6/124* (2006.01)

(52) U.S. Cl.
CPC .... *G02B 6/124* (2013.01); *G02B 2006/12102* (2013.01); *G02B 2006/12107* (2013.01)

(58) Field of Classification Search
CPC .......... G02B 6/124; G02B 2006/12102; G02B 2006/12107

USPC .......................................................... 385/14
See application file for complete search history.

(56) References Cited

U.S. PATENT DOCUMENTS

| | | | |
|---|---|---|---|
| 5,135,605 A | 8/1992 | Blonder | |
| 5,182,787 A | 1/1993 | Blonder | |
| 5,420,722 A | 5/1995 | Bielak | |
| 6,112,005 A | 8/2000 | Liu | |

(Continued)

FOREIGN PATENT DOCUMENTS

| EP | 1237019 | 9/2002 |
|---|---|---|
| JP | 2002328245 | 11/2002 |

(Continued)

OTHER PUBLICATIONS

International Search Report and Written Opinion dated Jan. 13, 2023, PCT/US2022/044374, 11 pages.

(Continued)

*Primary Examiner* — Jerry M Blevins
(74) *Attorney, Agent, or Firm* — Brownstein Hyatt Farber Schreck, LLP

(57) ABSTRACT

Configurations for an optical system used for guiding light and reducing back-reflection back in an output waveguide is disclosed. The optical system may include an output waveguide defined in a slab waveguide. The output waveguide may terminate before an output side of the slab waveguide, which may reduce the back-reflection of light from the output side back into the output waveguide. The output side may define an optical element that may steer the output light. The optical element may collimate the output light, cause the output light to converge, or cause the output light to diverge.

20 Claims, 29 Drawing Sheets

(56) References Cited

U.S. PATENT DOCUMENTS

| | | |
|---|---|---|
| 6,393,185 B1 | 5/2002 | Deacon et al. |
| 6,985,506 B2 | 1/2006 | Lissotschenko |
| 6,987,906 B2 | 1/2006 | Nakama et al. |
| 7,250,317 B2 | 7/2007 | Heideman |
| 7,995,875 B2 | 8/2011 | Yasuda et al. |
| 8,041,159 B2 | 10/2011 | Yanagisawa |
| 8,236,481 B2 | 8/2012 | Nottola et al. |
| 8,363,995 B2 | 1/2013 | Gothoskar et al. |
| 8,774,575 B2 | 7/2014 | Fujiwara et al. |
| 8,855,155 B2 | 10/2014 | Lutgen et al. |
| 9,025,926 B2 | 5/2015 | Chang et al. |
| 9,182,544 B2 | 11/2015 | Kobrinsky et al. |
| 9,229,169 B2 | 1/2016 | Doany et al. |
| 9,229,179 B2 | 1/2016 | Ishibashi |
| 9,285,555 B2 | 3/2016 | Yabre |
| 9,377,594 B2 | 6/2016 | Liff et al. |
| 9,411,105 B2 | 8/2016 | Anderson et al. |
| 9,470,864 B1 | 10/2016 | Yo |
| 9,507,086 B2 | 11/2016 | Kobrinsky et al. |
| 9,568,679 B2 | 2/2017 | Doany et al. |
| 9,696,486 B2 | 7/2017 | Zheng |
| 9,705,289 B2 | 7/2017 | Kanskar et al. |
| 9,829,631 B2 | 11/2017 | Lambert |
| 10,018,781 B1 | 7/2018 | Masuda |
| 10,025,044 B1 | 7/2018 | Masuda |
| 10,209,452 B1 | 2/2019 | Hung et al. |
| 10,261,389 B2 | 4/2019 | Skirlo et al. |
| 10,379,293 B2 | 8/2019 | Nakazuru et al. |
| 10,429,597 B2 | 10/2019 | ten Have et al. |
| 10,539,752 B2 | 1/2020 | Masuda |
| 10,558,003 B2 | 2/2020 | Ootorii |
| 10,613,282 B2 | 4/2020 | Cyr |
| 10,634,843 B2 | 4/2020 | Bayn et al. |
| 10,650,110 B2 | 5/2020 | Van Vaerenbergh et al. |
| 10,725,242 B2 | 7/2020 | Beausoleil et al. |
| 10,788,632 B2 | 9/2020 | Wang |
| 10,823,912 B1 | 11/2020 | Pelc et al. |
| 10,931,080 B2 | 2/2021 | Karplus |
| 11,143,820 B2 | 10/2021 | Tsunoda |
| 11,525,958 B1 | 12/2022 | Pelc et al. |
| 2014/0086527 A1 | 3/2014 | Ban et al. |
| 2016/0011375 A1* | 1/2016 | Anderson ............ G02B 3/0087 385/33 |
| 2020/0084050 A1 | 3/2020 | Mensch et al. |
| 2021/0263216 A1 | 8/2021 | Bishop et al. |
| 2022/0128782 A1 | 4/2022 | Goldis |
| 2024/0077686 A1* | 3/2024 | Pelc ...................... G02B 6/125 |

FOREIGN PATENT DOCUMENTS

| | | |
|---|---|---|
| JP | 2003-255164 A | 9/2003 |
| JP | 2008089879 | 4/2008 |
| JP | 2008262118 | 10/2008 |
| JP | 2010-079041 A | 4/2010 |
| JP | 2015-138926 A | 7/2015 |
| JP | 6384152 | 9/2018 |
| WO | WO 05/091036 | 9/2005 |

OTHER PUBLICATIONS

Suematsu et al., "Fundamental Transverse Electric Field (TEO) Mode Selection for Thin-Film Asymmetric Light Guides," *Applied Physics Letters*, American Institute of Physics, Melville, New York, vol. 21, No. 6, 1972, pp. 291-293.

He et al., "Integrated Polarization Compensator for WDM Waveguide Demultiplexers," *IEEE Photonics Technology Letters* vol. 11, No. 2, Feb. 1999, pp. 224-226.

Sauer et al., "Individualized FAC on Bottom Tab subassemblies to minimize adhesive gap between emitter and optics," *High-Power Diode Laser Technology XV*, edited by Mark S. Zediker, Proceeding of SPIE, vol. 10086, 2017, 8 pages.

* cited by examiner

LIGHT OUTPUT DEVICES AND LIGHT OUTPUTTING METHODS FOR OPTICAL SYSTEMS

CROSS-REFERENCE TO RELATED APPLICATIONS

This application claims the benefit under 35 U.S.C. § 119(e) of U.S. Provisional Patent Application No. 63/247,526, filed Sep. 23, 2021, the contents of which are incorporated herein by reference in their entirety.

FIELD

This disclosure relates generally to routing and outputting light in photonics integrated circuits. More particularly, embodiments herein relate to an optical system with an on-chip lens for outputting light from a waveguide.

BACKGROUND

Generally, photonics integrated circuits include optical systems with light sources. In some optical systems, the light emitted by the light sources is outputted from the optical system via output facets. These output facets may be cleaved and polished to increase the efficiency of the light output from the optical system. Although much of the light will be outputted, some of the light may reflect back from the output facet and into the optical system instead of exiting the optical system. This back-reflected light may propagate back to an output waveguide and/or the light source, which typically creates false etalons and impacts the stability of the light source.

SUMMARY

Embodiments of the systems, devices, methods, and apparatuses described in the present disclosure are directed to photonics integrated circuits that include light output devices with on-chip lenses. Also described are systems, devices, methods, and apparatuses directed to an optical system with an in-plane lens that reduces back-reflected light that may couple back into an output waveguide. The optical system may include the output waveguide that is positioned away from the output side of the slab waveguide and that transmits light so that the light may propagate through the slab waveguide before it passes through the output side of the slab waveguide. The output side of the slab waveguide forms or otherwise includes a lens that may change the direction that the light is propagating with respect to the optical axis. Because the in-plane lens is in the plane of the slab waveguide, back reflections into the output waveguide are reduced.

In some embodiments, the present disclosure describes an optical system. The optical system may include a slab waveguide with a free propagation region and an output side. The optical system also may include an output waveguide defined in the slab waveguide, the output waveguide including a propagation region through which light propagates and including a first side and a second side opposite the first side, a first light confining region adjacent to the first side of the propagation region, and a second light confining region adjacent to the second side of the propagation region. The output waveguide may terminate before the output side of the slab waveguide and before the free propagation region, the light may exit the propagation region into the free propagation region, and the light may exit the free propagation region at the output side, thereby reducing back reflections into the output waveguide.

In another embodiment, the present disclosure describes a method for guiding light. The method may include propagating the light through an output waveguide, emitting the light from the output waveguide into a free propagation region of a slab waveguide, and passing the light from the slab waveguide through an optical element in the output side of the slab waveguide, thereby reducing back reflections of the light from the output side of the slab waveguide.

In another embodiment, the present disclosure describes an optical system. The optical system may include a slab waveguide and an output waveguide defined in the slab waveguide. The output waveguide may include a propagation region that allows light to pass therethrough, a first light confining region adjacent to a first side of the propagation region, and a second light confining region adjacent to a second side of the propagation region, the second side opposite the first side of the propagation region. The optical system may also include an optical element defined in an output side of the slab waveguide, where the output waveguide terminates before the output side of the slab waveguide so that the light emitting from the propagation region of the output waveguide propagates through the slab waveguide before passing through the optical element, thereby reducing back reflection of the light off of the optical element and into the output waveguide.

Still other embodiments are directed to a photonic integrated circuit that includes a substrate, a cladding layer, and a waveguide layer. The waveguide layer includes a slab waveguide having a side surface, and an output waveguide that includes a first light confining region, a second light confining region, and a waveguide core positioned between the first light confining region and the second light confining region. The side surface of the slab waveguide defines an optical element forming a cylindrical lens having a semicircular curve, the output waveguide terminates into the slab waveguide at a junction between the output waveguide and the slab waveguide, and the output waveguide is positioned such that input light introduced from the output waveguide into the slab waveguide exits the photonic integrated circuit through the side surface.

In some of these variations, the semi-circular curve has a center of curvature, and the output waveguide is laterally offset relative to the center of curvature. In some of these variations, the junction between the output waveguide and the slab waveguide may be aligned with the center of curvature. In other variations, the junction between the output waveguide and the slab waveguide is positioned behind the center of curvature such that the center of curvature is positioned between the junction and the optical element. In still other variations, the junction between the output waveguide and the slab waveguide is positioned in front of the center of curvature such that the junction is positioned between the junction and the optical element.

In others of these variations, the waveguide layer includes a partially etched region between the output waveguide and the side surface of the slab waveguide so that the input light introduced from the output waveguide into the slab waveguide passes through the partially etched region. Additionally or alternatively, the output waveguide includes an index adjustment region positioned at the junction in which the widths of one or both of the first light confining region and the second light confining region decreases in a direction toward the junction. In other variations, the output waveguide includes an index adjustment region positioned at the junction in which the width of the waveguide core increases in a direction toward the junction.

Still other embodiments are directed to a photonic integrated circuit that includes a waveguide layer that includes a side surface that defines a plurality of optical elements, a plurality of slab waveguides, and a plurality of output waveguide. Each of the plurality of output waveguides includes a first light confining region, a second light confining region, and a waveguide core positioned between the first light confining region and the second light confining region. Each optical element of the plurality of optical elements is associated with a corresponding slab waveguide of the plurality of slab waveguides and a corresponding output waveguide of the plurality of output waveguides, such that input light introduced from the corresponding output waveguide into the corresponding slab waveguide exits the photonic integrated circuit through the optical element.

In some of these variations, each optical element forms an on-chip lens. Each optical element of the plurality of optical elements may form a cylindrical lens having a semi-circular curve having a center of curvature. In some of these embodiments, each output waveguide of the plurality of waveguides is laterally offset from the center of curvature of the optical element associated with the output waveguide. In other variations, all of the plurality of slab waveguides are optically connected.

Other embodiments described herein are directed to an optical system comprising a light source unit, a photonic integrated circuit, and a controller. The photonic integrated circuit includes a side surface and a plurality of emitters optically connected to the light source unit. Each emitter includes an optical element formed in the side surface, a slab waveguide, and an output waveguide positioned such that input light introduced from the output waveguide into the slab waveguide exits the photonic integrated circuit through the optical element. The controller is configured to control the plurality of emitters to emit output light.

In some of these variations, the plurality of emitters has the same configuration such that each emitter generates an output beam of light having the same shape and direction. Additionally or alternatively, the photonic integrated circuit includes a plurality of phase shifters, where each of which is controllable to adjust the phase of light carried by the output waveguide of a corresponding emitter. In some of these variations, the controller is configured to selectively control the phase of output light emitted by each of the plurality of emitters. Additionally or alternatively, the controller is configured to selectively control which of the plurality of emitters emits output light. Additionally or alternatively, the controller is configured to selectively control the intensity of output light emitted by each of the plurality of emitters. Additionally or alternatively, the controller is configured to selectively control a wavelength or wavelengths of output light emitted by each of the plurality of emitters.

Other embodiments described herein are directed to a photonic integrated circuit having a substrate, a cladding layer, and a waveguide layer. The waveguide layer includes a slab waveguide and a waveguide, where the waveguide includes a first light confining region, a second light confining region, and a waveguide core positioned between the first light confining region and the second light confining region. The waveguide terminates into the slab waveguide at a junction between the waveguide and the slab waveguide, and the waveguide includes an index adjustment region positioned at the junction in which the widths of one or both of the first light confining region and the second light confining region decreases in a direction toward the junction.

In some of these variations, the waveguide layer includes an optical splitter, where the optical splitter includes the slab waveguide, the waveguide, and a plurality of output waveguides. The optical splitter is configured such that input light introduced into the slab waveguide from the waveguide is split between the plurality of output waveguides. In other variations, the waveguide layer comprises a side surface that defines an optical element, and the waveguide is positioned such that input light introduced from the waveguide into the slab waveguide exits the photonic integrated circuit through the side surface. In some of these variations, the optical element forms an on-chip lens. In other variations, the optical element comprises a diffraction grating.

In other variations, the width of the waveguide core is constant in the index adjustment region. In still other variations, the width of the waveguide core narrows adiabatically in the index adjustment region in a direction toward the junction. In yet other variations, the width of the waveguide core increases non-adiabatically in the index adjustment region in a direction toward the junction. Additionally or alternatively, the widths of one or both of the first light confining region and the second light confining region decreases linearly in a direction toward the junction.

Still other embodiments are directed to a photonic integrated circuit that includes a substrate, a cladding layer, and a waveguide layer, where the waveguide layer includes a slab waveguide and a waveguide. The waveguide includes a first light confining region, a second light confining region, and a waveguide core positioned between the first light confining region and the second light confining region. The waveguide terminates into the slab waveguide at a junction between the waveguide and the slab waveguide, and the waveguide includes an index adjustment region positioned at the junction in which the width of the waveguide core increases in a direction toward the junction. In some of these variations, the waveguide layer includes an optical splitter, where the optical splitter includes the slab waveguide, the waveguide, and a plurality of output waveguides. The optical splitter is configured such that input light introduced into the slab waveguide from the waveguide is split between the plurality of output waveguides. In other variations, the waveguide layer comprises a side surface that defines an optical element, and the waveguide is positioned such that input light introduced from the waveguide into the slab waveguide exits the photonic integrated circuit through the side surface. In some of these variations, the optical element forms an on-chip lens.

Additionally or alternatively, the width of the waveguide core increases non-adiabatically in the index adjustment region. Additionally or alternatively, the widths of the first light confining region and the second light confining region are constant in the index adjustment region. In some variations, the waveguide includes an additional region in which the width of the waveguide core narrows adiabatically in a direction toward the junction, such that the index adjustment region is positioned between the additional region and the junction. Additionally or alternatively, the width of the waveguide core increases linearly in the index adjustment region.

Yet other embodiments are directed to an optical system that includes a light source unit configured to generate a set of wavelengths within a target wavelength range, and a photonic integrated circuit. The photonic integrated circuit includes a substrate, a cladding layer, and a waveguide layer, where the waveguide layer includes a slab waveguide and a waveguide. The waveguide includes a first light confining region, a second light confining region, and a waveguide core positioned between the first light confining region and the second light confining region. The waveguide terminates into the slab waveguide at a junction between the waveguide and the slab waveguide, and the waveguide includes an index adjustment region positioned in which the widths of each the first light confining region and the second light confining region narrow from a first width to a second width in a direction toward the junction.

In some of these variations, a portion of each of the first light confining region and the second light confining region having the second width has a length, such that the length is one quarter of a wavelength within the target wavelength range. Additionally or alternatively, the width of the waveguide core increases from a third width to a fourth width in the index adjustment region.

In addition to the example aspects and embodiments described herein, further aspects and embodiments will become apparent by reference to the drawings and by study of the following description.

Figure 1:
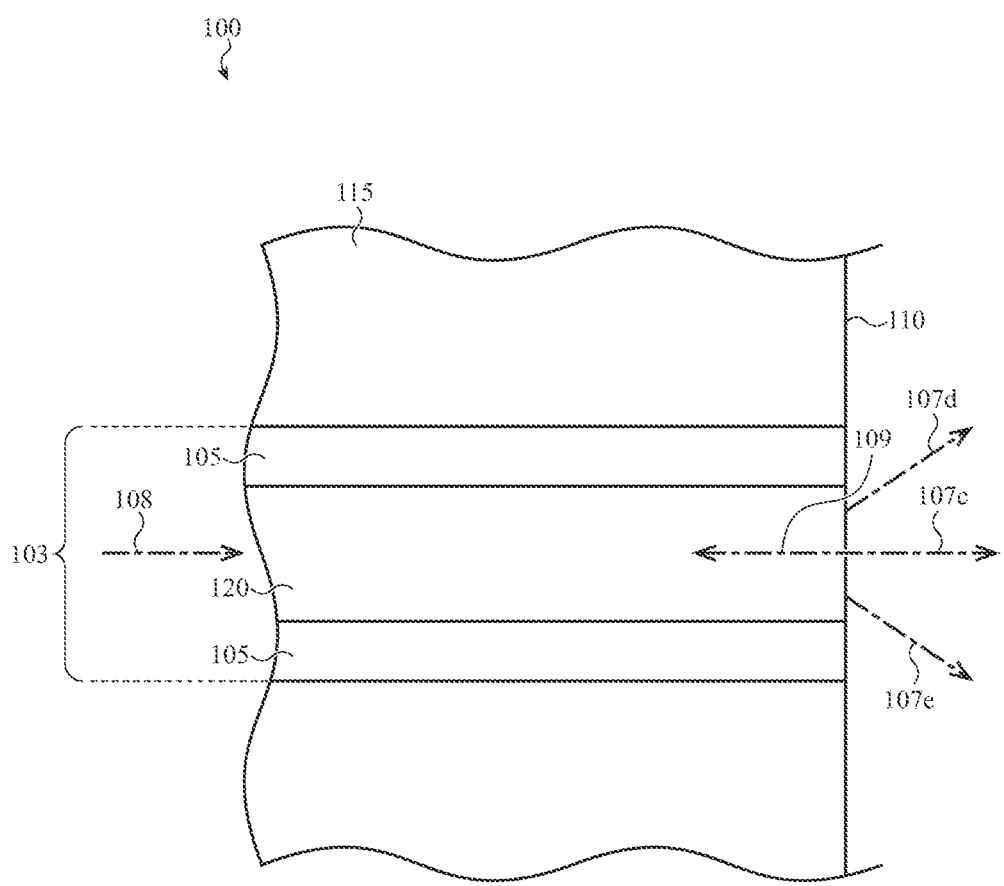
FIG. 1 shows a top view of a general optical system including a waveguide that outputs light.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

As used throughout this specification, a reference number without an alpha character following the reference number can refer to one or more of the corresponding references, the group of all references, or some of the references. For example, "107" can refer to any of the light 107 (e.g., light 107a or light 107b, etc.), or can refer to all of the light 107, depending on the context in which it is used. The term light 107 may be used when discussing light that is emitted out of the waveguide or light that exits the optical system or the photonics integrated circuit.

In the following description of examples, reference is made to the accompanying drawings in which it is shown by way of illustration specific examples that can be practiced. It is to be understood that other examples can be used, and structural changes can be made without departing from the scope of the various examples.

DETAILED DESCRIPTION

Reference will now be made in detail to representative embodiments illustrated in the accompanying drawings. It should be understood that the following description is not intended to limit the disclosure to any preferred embodiment. To the contrary, it is intended to cover alternatives, modifications, and equivalents as can be included within the spirit and scope of the described embodiments as defined by the appended claims.

Described herein are photonic integrated circuits, as well as associated optical systems and methods, with optical components that are designed to reduce back reflections during operation of these optical components. In some embodiments, the photonic integrated circuit includes a facet that is designed to launch light received from an output waveguide while reducing back reflections returned to the output waveguide. Additionally or alternatively, the photonic integrated circuit includes a junction between an output waveguide and a slab waveguide that is configured to reduce back reflections at the junction.

The optical systems described herein may include one or more photonic integrated circuits that route light using one or more waveguides. In a photonic integrated circuit, waveguides are typically supported on a planar substrate and confine light to travel along a horizontal plane of the photonic integrated circuit. In order to launch light from a photonic integrated circuit, light may either be redirected from the horizontal plane (e.g., through a top or bottom surface of the photonic integrated circuit) using a vertical output coupler or may exit horizontally along a lateral side surface of the photonic integrated circuit.

Typically, when light is emitted horizontally from a lateral side surface of a photonic integrated circuit, a waveguide terminates at this lateral side surface such that light exits the photonic integrated circuit directly from a facet of waveguide. That is, the waveguide terminates at a side surface of the photonic integrated circuit so that light from the waveguide passes directly from the waveguide out of the optical system. When light passes through the interface between the waveguide and another material (e.g., air surrounding the photonic integrated circuit, another optical component placed in contact with the photonic integrated circuit), some of the light may undesirably reflect from the side of the photonic integrated circuit back into the waveguide. This back-reflected light may create etalons and negatively impact the stability of light sources used to generate illumination in the photonic integrated circuit. Although solutions such as anti-reflective coatings may mitigate some back reflection of light, they may not completely eliminate these back reflections. Accordingly, in many instances, it is desirable to configure the emissions surfaces of a photonic integrated circuit to minimize the amount of light that is back-reflected into a waveguide.

Additionally, in some instances it may be desirable to shape the light that is launched from a photonic integrated circuit, such that the light forms one or more beams having a particular shape, divergence, etc. While optical systems may incorporate one or more free space lenses to help, the addition of free space lenses may add cost, design complexity, and overall size of the optical system. Accordingly, it may be desirable to reduce the number of free space lenses used in a given optical system.

The photonics integrated circuits described herein, as well as the optical systems that incorporate these photonic integrated circuits, receive and route light from one or more light sources (e.g., of a light source unit as described in more detail herein). The light source(s) generate light that is received by one or more waveguides, either directly or indirectly via one or more intermediate components (e.g., multiplexers, demultiplexers, optical power splitters, switches, optical couplers, phase shifters, combinations thereof, or the like). The waveguides are used to route light in the photonic integrated circuit and, for some waveguides, launch light from the photonic integrated circuit.

Some embodiments described herein are directed toward output facets of a photonic integrated circuit that allow for light from a waveguide ("an output waveguide"), such as a strip waveguide, rib waveguide, or the like, to be emitted from the photonic integrated circuit while reducing the amount of back-reflected light that is coupled back into the output waveguide. These output facets may be further configured to control or otherwise adjust the beam divergence of the light that is emitted from the output facet photonic integrated circuit. In these instances, the output waveguide is connected to a slab waveguide, such that the slab waveguide connects the output waveguide to the output facet of the photonic integrated circuit. The output waveguide receives input light generated from one or more light sources, and passes the input light to the slab waveguide. The slab waveguide has an output side that forms an output facet of the photonic integrated circuit, and the input light received from the output waveguide exits the slab waveguide through the output side.

Specifically, the output waveguide terminates before the output facet of the photonic integrated circuit, and thus light exiting the output waveguide will propagate through the slab waveguide before reaching the output side of the slab waveguide. The input light diffracts when it reaches the slab waveguide, and the slab waveguide acts a free propagation region. The input light diverges within the slab waveguide until it reaches the output side of the slab waveguide (or an intervening optical component, such as a partially-etched region as discussed in more detail herein). Because the output side of the slab waveguide forms a portion of the output facet of the photonics integrated circuit, light exiting the slab waveguide is emitted from the photonic integrated circuit.

In some embodiments, the output side of the slab waveguide may also be configured to adjust the divergence of the input light as it exits the slab waveguide. The output side includes an optical element, such as a lens, that steers or otherwise controls a direction of the light that passes through the output side to exit the photonic integrated circuit. For example, a portion of the output side of the slab waveguide may be shaped to form a lens (which is also referred to herein as an "on-chip lens").

The output side may be shaped to define an optical element having any suitable shape and orientation relative to other output waveguides. For example, the optical element may be concave, convex, flat, and/or oriented at an angle with respect to another portion of the side of the slab waveguide, or any combination thereof. Depending on the structure of the optical element, light passing therethough is steered in a desired direction to produce converging light, diverging light, or collimated light. In some embodiments, the output side of the optical system may be flat and have reduced or little impact on shaping the light as it leaves the optical system, but the positioning of the output waveguide away from the output side may reduce the back-reflected light that is coupled into the output waveguide.

These and other embodiments are discussed herein with reference to FIGS. 1-22C However, those skilled in the art will readily appreciate that the detailed description given herein with respect to these Figures is for explanatory purposes only and should not be construed as limiting.

FIG. 1 shows a top view of a portion of optical system 100 including an output waveguide 103 that terminates at an output side 110 of the optical system 100 (e.g., an output facet on the side of a photonic integrated circuit) to facilitate emitting light from the output side 110. The output waveguide 103 may receive input light 108 that is generated by one or more light sources (not illustrated), and may output some of this light (depicted as rays 107c, 107d, and 107e) through the output side 110 of the optical system 100. As illustrated, the output waveguide 103 abuts and terminates at the output side 110.

As shown in FIG. 1, the output waveguide 103 includes a waveguide core 120 through which the input light 108 may propagate, and includes a pair of light confining regions 105 that define the waveguide core 120 and provide optical confinement to the waveguide core 120. Typically, the photonic integrated circuits described herein include a substrate, a cladding layer, and a waveguide layer positioned on the cladding layer. The waveguide layer may be etched or patterned to define cavities in the waveguide layer that define light confining regions (e.g., the light confining regions 105 of FIG. 1). These light confining regions in turn may define the shape of waveguides (e.g., the waveguide 103 of FIG. 1) and other optical components within the waveguide layer of the photonic integrated circuit. In some variations, the photonic integrated circuit includes an additional cladding layer or layers that fill the light confining regions. In some of these instances, an additional cladding layer or layers may also cover a top side of the waveguide. In other instances, the light confining regions may be left unfilled to provide an air interface to the lateral side surfaces of the waveguide. In some of these instances, the top surface of a waveguide may also be uncovered to provide an air interface with the top surface of the waveguide.

Accordingly, in some instances one or more cladding layers collectively surround a waveguide core along the length of the waveguide to provide optical confinement thereto. In other instances, one or more surfaces of the waveguide core may be exposed along the length of the waveguide to provide an air interface as mentioned immediately above (which may also provide optical confinement to the waveguide). The various layers of the photonic integrated circuits described herein may be formed from any suitable materials depending on the wavelength or wavelengths of light that will be carried by the waveguides defined in the photonic integrated circuit. For example, in some variations, the waveguide layer (and thereby any waveguide core) is formed from silicon, silicon nitride, silica, or the like, the cladding layer (or layers) is formed from a dielectric material (or materials) such as silicon dioxide, and the substrate is formed from silicon.

Returning to FIG. 1, the light confining regions 105 separate the waveguide 120 from an adjacent slab waveguide 115. Accordingly, the input light 108 may be confined within the waveguide core 120 until it reaches the output side 110 of the optical system 100. At this point, the input light 108 is largely emitted from the output side 110 of the optical system 100 (as indicated by rays 107c, 107d, and 107e). Depending on the width of the waveguide core 120, the wavelength (or wavelengths) of the input light 108, and the refractive index difference between the waveguide core 120 and any material contacting the output side 110 of the optical system 100 (e.g., air), some of the input light 108 that reaches the output side 110 will be back reflected into the output waveguide 103 as back-reflected light 109. When the back-reflected light 109 couples back into the output waveguide 103, the back-reflected light 109 may create undesirable etalons and negatively affect the light source stability (e.g., of the light source generating the input light 108).

Figure 2:
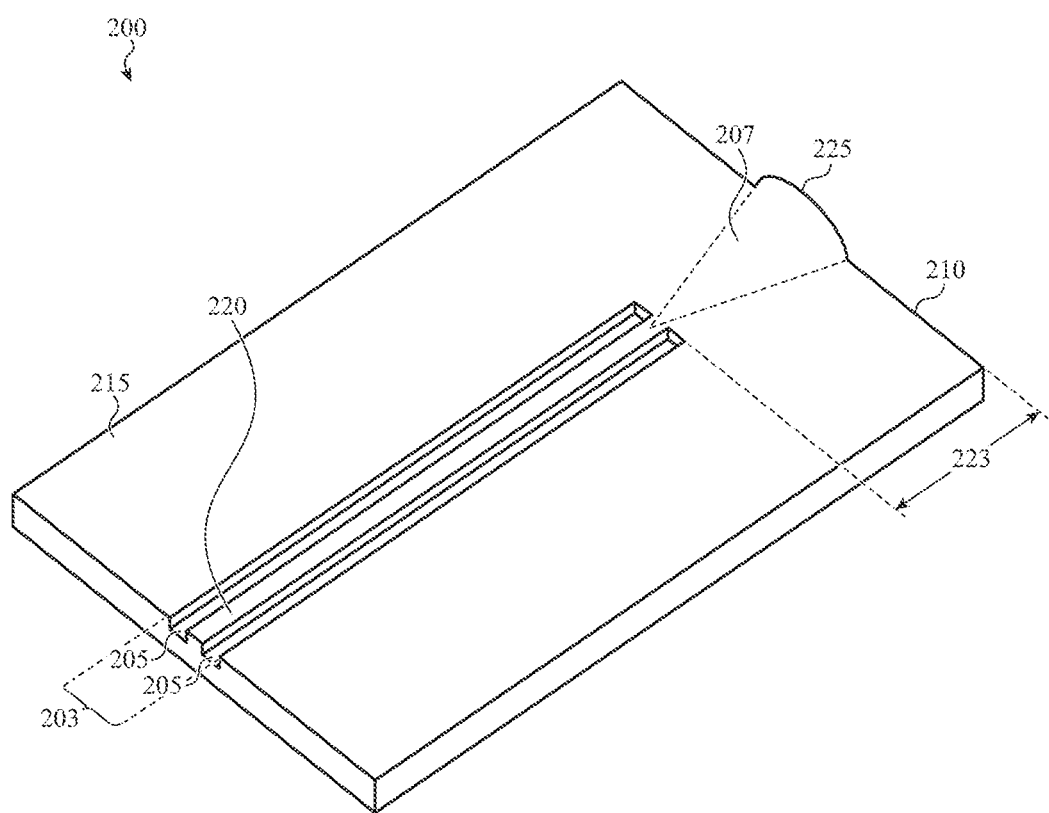
FIG. 2 shows a top view of an example of an optical system including a waveguide that terminates before the output side of the optical system.

FIG. 2 is an example of an optical system 200 as described herein that includes an output waveguide 203 that terminates before an output side 210 of a slab waveguide 215 of the optical system 200, such that light travels through the slab waveguide 215 prior to reaching the output side 210. As a result, the optical system 200 may be designed to help mitigate back-reflected light as compared to the output waveguide 103 described with respect to FIG. 1. In some embodiments, the optical system 200 includes an optical element 225. While the optical element 225 is shown in FIG. 2 as being formed as part of the output side 210, an optical element may additionally or alternatively be formed within the slab waveguide 215. Embodiments of the optical element and variations thereof will be described in further detail with reference to FIGS. 3-19B and 21A-21C.

The output waveguide 203 may be part of a photonic integrated circuit as described herein, and the output side 210 may be an output facet of the photonic integrated circuit, such that light received by the output waveguide 203 is launched from a side surface of the photonic integrated circuit. In these instances, the light launched from the output facet of the photonic integrated circuit may be emitted from the optical system or may be transmitted to another element of the optical system, depending on the design of the optical system. Specifically, the output waveguide 203 may terminate some distance 223 from the output side 210 and emit light into the slab waveguide 215. The input light diffracts when it reaches the slab waveguide 215, and the slab waveguide acts as a free propagation region 207 that allows the input light to spread out while propagating toward the output side 210.

When a waveguide (e.g., an output waveguide or an input waveguide) is described herein as terminating at a slab waveguide, the waveguide includes a waveguide core that is positioned between a pair of light confining regions such that a first light confining region is adjacent to the first side of the waveguide core and a second light confining region adjacent to the second side of the waveguide core. The pair of light confining regions define the shape of waveguide core and act to optically confine light within the waveguide core. The waveguide terminates at the slab waveguide at a junction between the waveguide and the slab waveguide. The pair of light confining regions also terminate at this junction, thereby causing the waveguide core to transition into the slab waveguide. Light passing from the waveguide core to the slab waveguide may diffract and freely propagate in the slab waveguide as described herein.

For example, the output waveguide 203 includes a waveguide core 220 positioned between a pair of light confining regions 205 within a planar waveguide layer, such as described herein. The light confining regions 205 terminate at a junction between the output waveguide 203 and the slab waveguide 215 in order to couple the output waveguide 203 to the slab waveguide 215. Because the light confining regions 205 no longer confine light as it enters the slab waveguide 215, the light is able to spread in the plane of the waveguide layer as it travels through the free propagation region 207. The distance 223 that the output waveguide 203 is separated from the output side 210 (i.e., between the termination of the output waveguide 203 and the output side 210) controls how much the light spreads before exiting the waveguide layer. This may thereby control the size of the beam of light that reaches the output side 210, which may impact the amount of light that is back-reflected as the input light passes through the output side 210 (e.g., through the optical element 225) into a material on the other side of the output side (e.g., into free space or into another material abutting the optical system 200).

While most of the emitted light leaves the slab waveguide 215 through the output side 210 (e.g., through optical element 225 in the variation shown in FIG. 2), a small amount of light may be back reflected from the output side 210 (e.g., from the optical element 225 in the variation shown in FIG. 2). Depending on the design of the output side 210, some or all of this back-reflected light will not couple back into the output waveguide 203. Instead, the back-reflected light may be directed to a different portion of the photonic integrated circuit such that it does not reach the waveguide core 220 of the output waveguide 203.

In instances where the output side 210 includes an optical element 225, that optical element may be formed in any suitable manner. For example, the optical element 225 may be defined by etching (e.g., wet or dry etching) a portion of a photonic integrated circuit to create a desired shape in a side surface of the photonic integrated circuit. To form the optical element, the photonic integrated circuit is etched at least through the waveguide layer to define the optical element 225. As discussed herein, the photonic integrated circuit may include a substrate supporting a cladding layer (e.g., a lower cladding layer), a waveguide layer positioned on the cladding layer (and defining the output waveguide 203 and slab waveguide 215), and optionally an additional cladding layer on the waveguide layer (e.g., an upper cladding layer). In some instances, the photonic integrated circuit may be etched through the upper cladding layer (in instances that include this layer), the waveguide layer, and at least partially through the lower cladding layer. In some of these variations, the photonic circuit may be etched through the lower cladding layer and at least partially through the substrate.

In this way, at least a portion of an output facet of the photonic integrated circuit may be a vertical surface that is angled and/or curved, such that light exits the photonic integrated circuit horizontally through this vertical surface. The optical element may be defined to have any suitable shape as may be desired (e.g., concave symmetric curve, convex symmetric curve, concave asymmetric curve, convex asymmetric curve, square, gratings, any combination thereof, and so forth). The etching that is used to define the output side 210 and the optical element 225 may be part of a process step that is used to define other components of the photonic integrated circuit, and thus incorporating the optical element may add little to no additional time or complexity into the manufacturing of the photonic integrated circuit.

To further reduce back-reflections from the output side 210, one or more portions of the output side 210 (e.g., the optical element 225) may be coated with an anti-reflective coating. In some embodiments, the anti-reflective coating may be one or more layers of dielectric materials. The anti-reflective coating may be coated, deposited, bonded to, any combination thereof, and so forth so that the anti-reflective coating may be adjacent to the optical element 225. It should be appreciated that anti-reflective coating may be applied to any output facet of the various embodiments of photonic integrated circuits described herein (e.g., to the output sides of the slab waveguides through which the light is emitted).

Figure 16A:
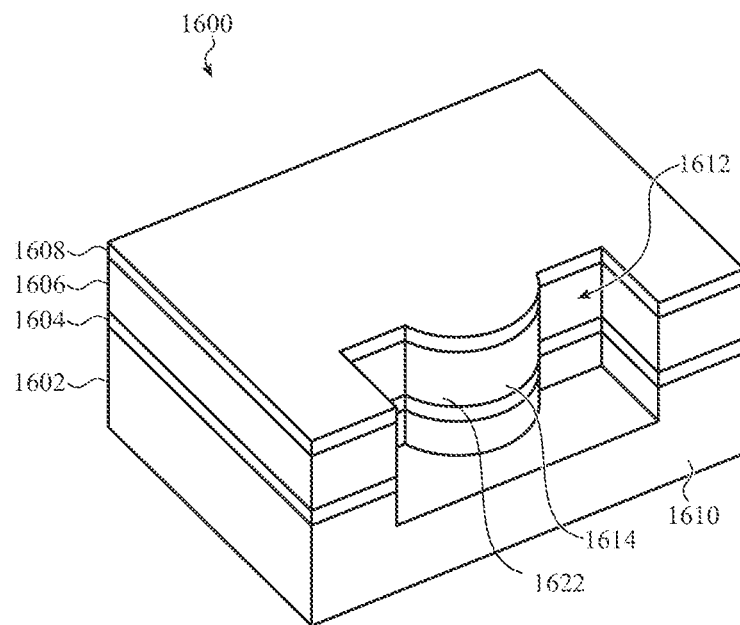
FIGS. 16A and 16B show perspective and top views, respectively, of a photonic integrated circuit having an output side surface positioned on an exterior side of the photonic integrated circuit.

In some embodiments, at least a portion of the photonic integrated circuit may extend beyond an output facet through which light is emitted. For example, FIG. 16A shows a perspective view of a variation of photonic integrated circuit 1600 as described herein. As shown there, the photonic integrated circuit 1600 includes a substrate 1602, a first dielectric layer 1604, a waveguide layer 1606, and a second dielectric layer 1608. The first dielectric layer 1604 is supported (directly or indirectly) by the substrate 1602, the waveguide layer 1606 is positioned on the first dielectric layer 1604, and the second dielectric layer 1608 is positioned on the waveguide layer 1606. In this way, the first and second dielectric layers 1604, 1608, may optically confine light carried by the photonic integrated circuit 1600 within the plane of the waveguide layer 1606.

The photonic integrated circuit 1600 includes a lateral side surface 1610 that forms part of the perimeter of the photonic integrated circuit 1600. For example, the photonic integrated circuit 1600 may be formed as part of a larger wafter that is diced to expose the lateral side surface 1610. A portion of the photonic integrated circuit 1600 is etched to define an output facet 1612 that is used to output light from the photonic integrated circuit 1600 as described herein. Specifically, in the variation shown in FIG. 16A, the photonic integrated circuit 1600 is etched through the second dielectric layer 1608, the waveguide layer 1606, the first dielectric layer 1604, and a portion of the substrate 1602. The photonic integrated circuit 1600 may be etched to define an optical element 1614 in the output facet 1612 (which may be defined in an output surface of a slab waveguide as described previously). It may be preferable to select an etch depth that is deep enough such that output light is not clipped by the surrounding portions of the photonic integrated circuit 1600 as it propagates away from the output facet 1612.

Figure 16B:
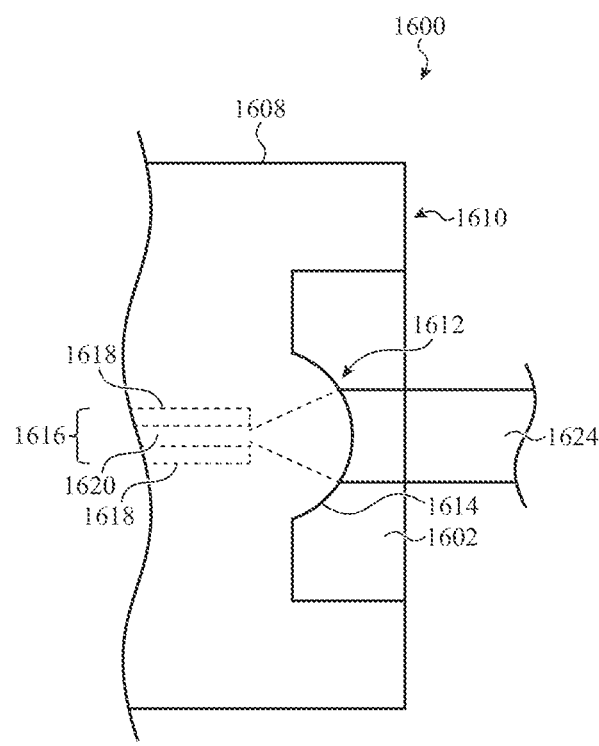

The output facet 1612 is recessed relative to the lateral side surface 1610, such that light exiting the photonic integrated circuit 1600 from the output facet 1612 may travel past the lateral side surface 1610 (if not redirected by another optical component of an optical system that includes the photonic integrated circuit 1600). For example, FIG. 16B shows a top view of a portion of the photonic integrated circuit 1600. As shown there, an output waveguide 1616 may be defined in the waveguide layer 1606 via a pair of light confining regions 1618 to define a waveguide core 1620. These light confining regions 1618 may be filled by the second cladding layer 1608 or by an additional cladding layer (e.g., formed from a different material and/or deposited in a separate step from the second cladding layer 1608). The output waveguide 1616 terminates into a slab waveguide 1622 that is also defined in the waveguide layer 1606. The output waveguide 1616 may pass light 1624 into the slab waveguide 1622, in which the light 1624 diverges as it approaches the output facet 1612. The light 1624 passes through the output facet 1612 (which forms an output surface of the slab waveguide 1622) to exit the photonic integrated circuit 1600. As shown in FIG. 16B, the light 1624 travels past the lateral side surface 1610 after it has exited the photonic integrated circuit 1600 through the output facet 1612.

Figure 16C:
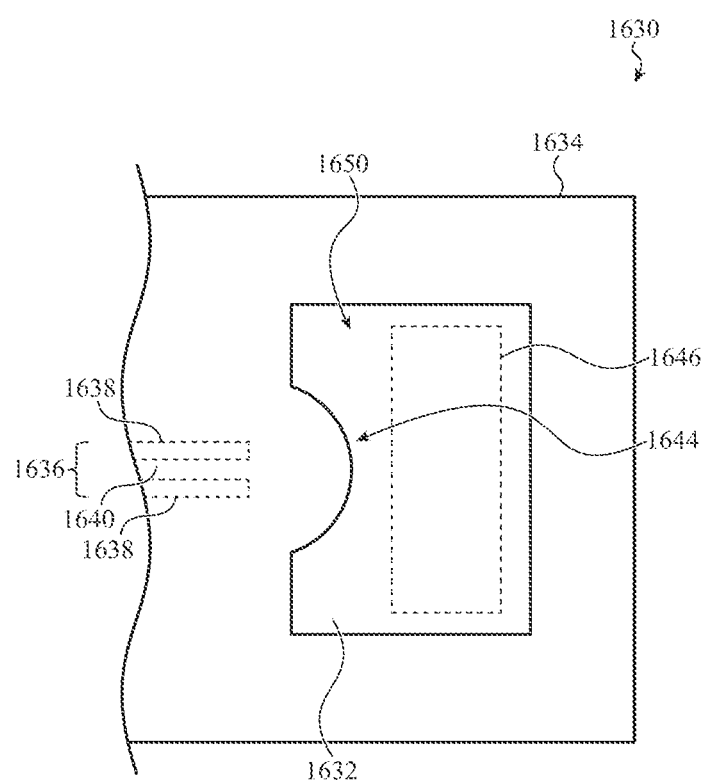
FIG. 16C shows a top view of another variation of a photonic integrated circuit having an output side surface on an interior side of the photonic integrated circuit.

While output facet 1612 forms an exterior surface of the photonic integrated circuit 1600 (i.e., forms a part of the outer perimeter of the photonic integrated circuit 1600), in other variations a photonic integrated circuit may be configured to emit light from an interior surface of a cavity defined in the photonic integrated circuit. For example, FIG. 16C shows a top view of another embodiment of a photonic integrated circuit 1630. The photonic integrated circuit 1630 can include, for example, a substrate 1632, a lower cladding layer (not shown) supported by the substrate 1632, and a waveguide layer 1634 positioned on the lower cladding layer. In some instances, the photonic integrated circuit 1630 further includes an upper cladding layer (not shown) positioned on the waveguide layer 1634. The photonic integrated circuit 1630 defines a cavity 1650 that extends at least partially through the photonic integrated circuit 1630 to expose a portion of the waveguide layer 1634. For example, in the variation shown in FIG. 1C, the cavity extends through the upper cladding layer (in variations that include this layer), the waveguide layer 1634, and the lower cladding layer, and extends partially through the substrate 1632.

In these variations, the photonic integrated circuit 1630 is configured such that a surface of the cavity 1650 acts an output facet 1644 through which light is emitted from the photonic integrated circuit 1630. As shown there, the photonic integrated circuit 1630 includes an output waveguide 1636 that includes a waveguide core 1640 defined by a pair of light confining regions 1638. The output waveguide 1636 terminates at a slab waveguide defined in the waveguide layer 1634. The output facet 1644 defines an output surface of the slab waveguide, such that light introduced into the slab waveguide from the output waveguide 1636 is emitted from the slab waveguide through the output facet 1644. This light will exit the waveguide layer 1634 into the cavity 1650.

Because the interior of the cavity 1650 is bounded by surfaces of the photonic integrated circuit 1630, at least some of the light exiting the waveguide layer 1634 through the output facet 1644 will be directed toward an opposite surface of the cavity 1650. Accordingly, the photonic integrated circuit 1630 may be configured to redirect this light out of the cavity 1650. For example, in some variations, the surface of the cavity 1650 opposite the output facet 1644 may be angled non-vertically (and optionally coated with a reflective material such as a metal) to redirect light away from the plane of the waveguide layer 1634 and out of the cavity 1650. In other variations, an additional component 1646 may be inserted at least partially into the cavity. This additional component 1646 may include one or more angled surfaces and/or other features configured to redirect light away from the plane of the waveguide layer 1634 and out of the cavity 1650. In some variations, any space between the side surface 1644 and the additional component 1646 may be filled with another type of material, which may act to limit the divergence of the light before it reaches the additional component 1646.

In order to generate light carried and emitted by the output waveguides described herein, the optical systems described herein may include a light source unit that is configured to generate light. The light source unit may be configured to generate light at a single wavelength, or may be able to generate multiple different wavelengths across a predetermined wavelength range. The light source units described herein include a set of light sources (that may be a single light source or a plurality of different light sources), each of which is selectively operable to emit light at a corresponding set of wavelengths.

Each light source may be any component capable of generating light at one or more particular wavelengths, such as a light-emitting diode or a laser. A laser may include a semiconductor laser, such as a laser diode (e.g., a distributed Bragg reflector laser, a distributed feedback laser, an external cavity laser), a quantum cascade laser, or the like. A given light source may be single-frequency (fixed wavelength) or may be tunable to selectively generate one of multiple wavelengths (i.e., the light source may be controlled to output different wavelengths at different times). The set of light sources may include any suitable combination of light sources, and collectively may be operated to generate light at any of a plurality of different wavelengths.

To the extent the light source unit is capable of generating multiple different wavelengths, the light source unit may be configured to generate different wavelengths of light simultaneously and/or sequentially. Some or all of the light sources of the light source unit may be integrated into the photonic integrated circuits described herein. Additionally or alternatively, some or all of the light sources of the light source unit may be positioned separately from the photonic integrated circuit and couple light into the photonic integrated circuit. As mentioned previously, the optical system may include additional components (not shown) between the light sources of the light source unit and the output waveguides, such that the light may be altered before it reaches the output waveguide as input light.

When the waveguides described herein are discussed as carrying input light having and/or operating over a range of wavelengths (e.g., a "target range of wavelengths"), it should be appreciated that in some instances the light source unit need not be able to generate the entire spectrum within that range (i.e., every wavelength between the longest and shortest wavelength of the range). Instead, the light source unit may generate a discrete number or set of wavelengths within the range. Similarly, the output waveguides may not necessarily simultaneously carry every one of these wavelengths, and instead may receive these wavelengths at different times depending on the operation of the optical system. Additionally, the target range of wavelengths may span any particular bandwidth, depending on the needs of the optical system. For example, in some instances a target range of wavelengths may span at least 100 nm. In some of these variations, the target range of wavelengths may span at least 500 nm. In some of these variations, the target range of wavelengths may span at least 1000 nm.

Figure 3:
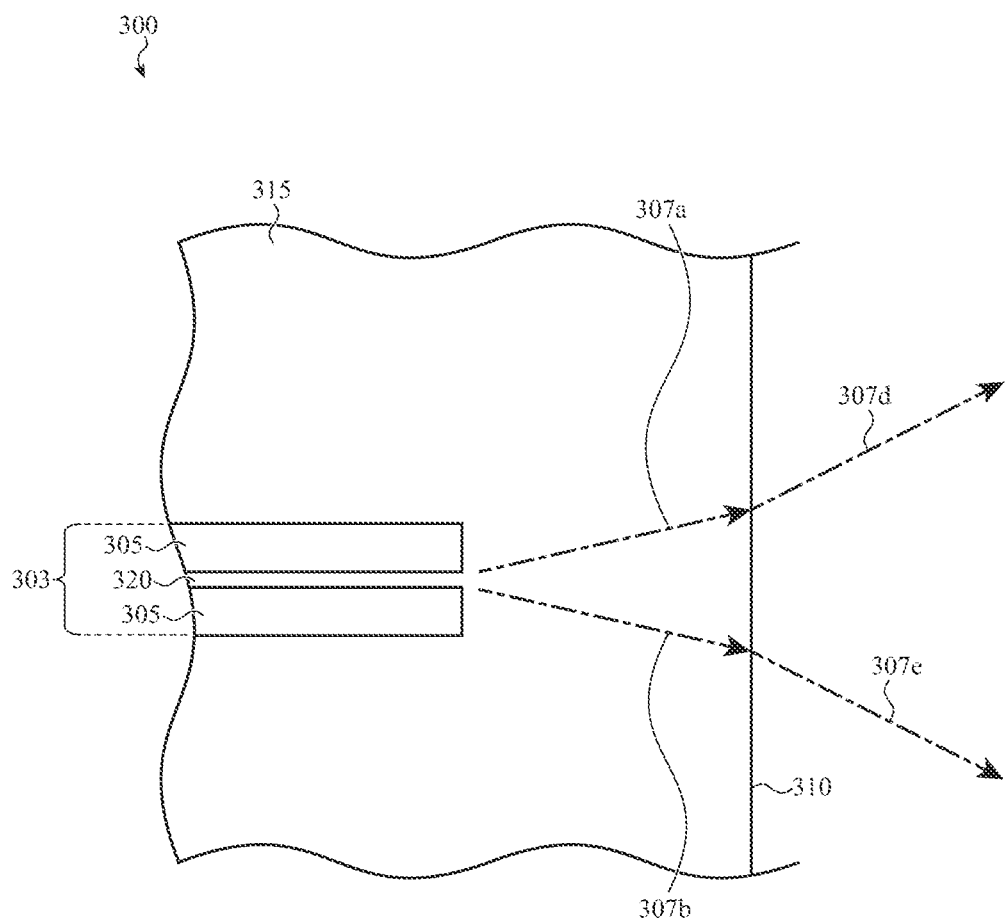
FIG. 3 shows a top view of an example of an optical system that mitigates back-reflection of light.

FIG. 3 is an example of another optical system 300 that mitigates back-reflection of light. Specifically, the optical system 300 is configured to emit light from an output side 310 (which may be an output facet of a photonic integrated circuit as discussed herein) that does not include an optical element defined by the output side 310. The optical system 300 includes an output waveguide 303 and a slab waveguide 315, each of which may be defined in a waveguide layer as discussed previously. The output waveguide 303 may include a waveguide core 320 that is defined by a pair of light confining regions 305, such that light propagating through the waveguide core 320 is confined by the light confining regions 305. The output waveguide 303 terminates at a junction with the slab waveguide 315, which acts as a free propagation region for light exiting the output waveguide 303.

The early termination of the output waveguide 303 (i.e., before the output side 310) may reduce the amount of back-reflected light 307a, 307b from coupling back into the waveguide core 320 of the slab waveguide 315 (which may be further mitigated in instances where the output side 310 is coated with an anti-reflective coating). Specifically, input light exiting the output waveguide 303 (the outer light rays of this input light are represented by rays 307a, 307b) will diverge as it travels through the slab waveguide 315, which may reduce the amount of back-reflected light that is directed into the output waveguide 303. As light exits the slab waveguide 315 though the output side 310, the refractive index changes between the slab waveguide 315 and the surrounding material (e.g., air) may cause the divergence of the output light (the outer light rays of this light are represented by rays 307d, 307e) to increase relative to divergence of the input light. Although light beams are shown as outer light rays in FIGS. 3-15, it may be understood that the light fills the space between the outer light rays and the outer light rays are representative of the outer limits of the emitted light.

Figure 4:
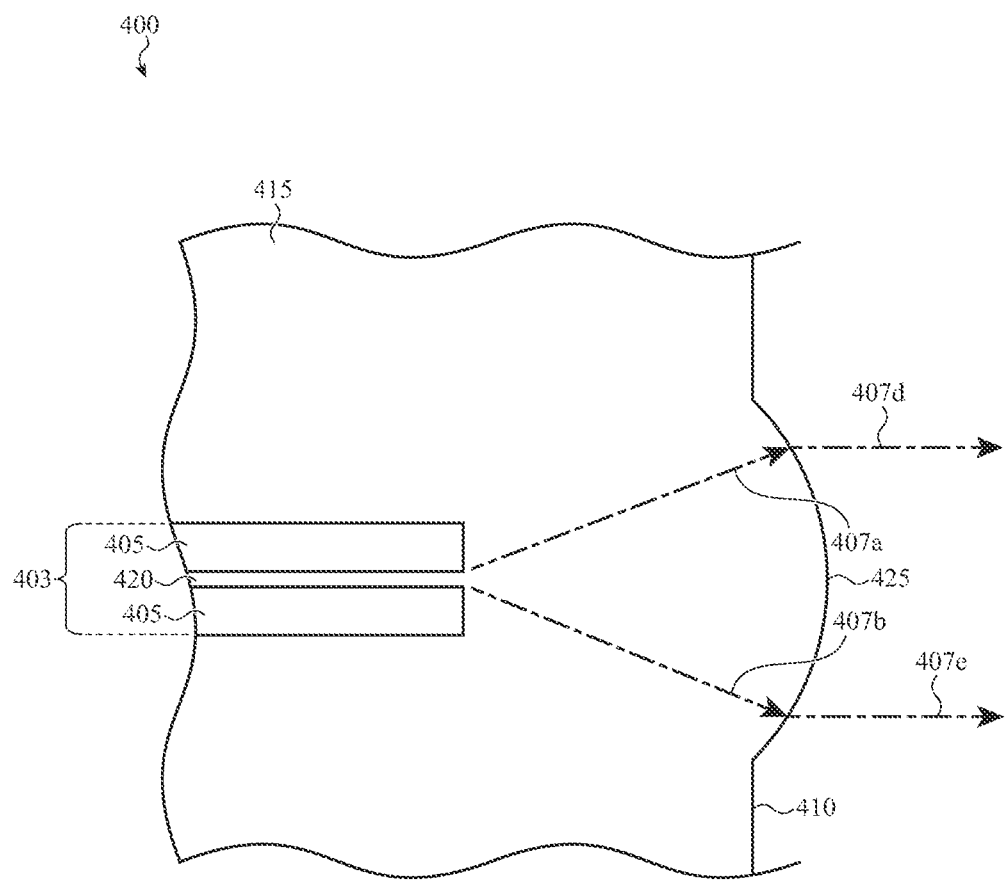
FIG. 4 shows a top view of an example of an optical system with an optical element that collimates the output light.

Depending on the refractive index change that occurs at the output side 310, the magnitude of this divergence change may be larger than would otherwise be desired for a given optical system. Accordingly, in some variations an output facet of a photonic integrated circuit may be configured to define an optical element that may help shape the beam of light that exits the output side. For example, FIG. 4 shows an example of an optical system 400 that has a side surface 410 that defines an optical element 425, where the optical element 425 forms an on-chip lens. In this variation, the optical element 425 is configured to collimate light as it is emitted from the side surface 410.

The optical system 400 includes a slab waveguide 415 and an output waveguide 403. For example, the slab waveguide 415 and the output waveguide 403 may be defined in a waveguide layer of a photonic integrated circuit, such as described previously, wherein the side surface 410 is an output facet of the photonic integrated circuit. The output waveguide 403 has a waveguide core 420 (defined by a pair of light confining regions 405, which are configured as discussed previously) that is connected to the slab waveguide 415. In this way, the output waveguide 403 terminates before reaching the side surface 410. Accordingly, input light received by the output waveguide 403 is passed to the slab waveguide 415 (which acts as a free propagation region), in which the input light, the boundaries of which are represented by rays 407a, 407b, will diverge as it approaches the optical element 425.

As the input light passes through the optical element 425 to generate an output light beam, the optical element 425 will act as a positive lens (i.e., a lens having positive refractive power) that collimates the output light (represented by outermost rays 407d and 407e). This collimation occurs within the plane of the waveguide layer defining the slab waveguide 415 (i.e., the slow axis), and it should be appreciated that light may still diverge in a direction perpendicular to the plane of the slab waveguide 415 (i.e., the fast axis) after it exits through the side surface 410. While additional free space optical elements (e.g., a lens element such as a fast axis collimator) may be added to the optical system 400 to adjust the beam profile in the fast axis, the optical element 425 may reduce the number and/or complexity of free space optical elements necessary to achieve a desired beam profile for the output light in the slow axis.

In the variation shown in FIG. 4, the optical element 425 has a convex shape, such as a curve with a positive radius of curvature (i.e., curves toward the output waveguide 403). While the beam width of input light is sized in FIG. 4 such that the beam passes through only a portion of the optical element 425, this is for illustrative purposes only. The optical element 425 may be sized such that the input light passes through a greater or smaller portion of the optical element 425, as may be desired. For example, in some instances optical element 425 may be sized and positioned such that the input light spreads out to the approximate width of the optical element 425 (e.g., within 5% of the width of the optical element 425) as the input light passes through the optical element 425.

Figure 5:
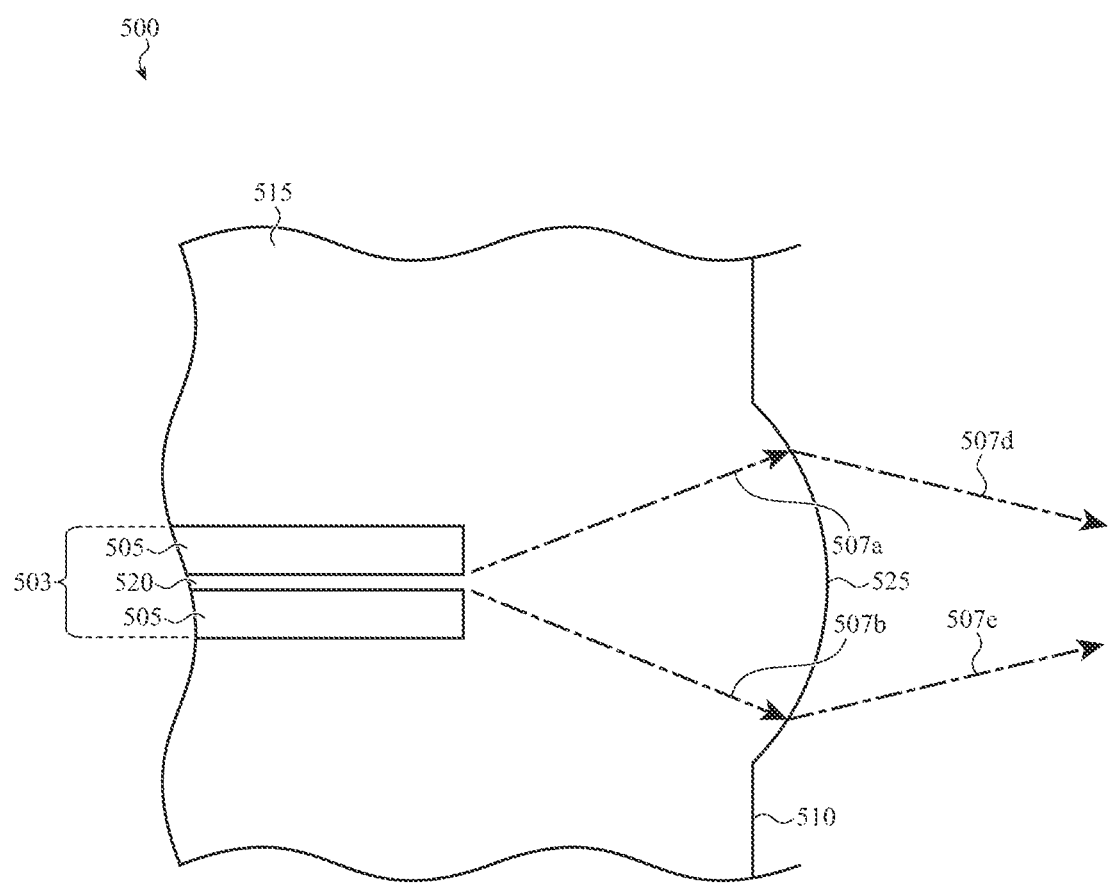
FIG. 5 shows a top view of an example of an optical system with an optical element that steers the output light to converge.

In other instances, an optical element may be configured to focus light that is emitted from a side surface such that the light converges. FIG. 5 is an example of an optical system 500 that has a side surface 510 that defines an optical element 525, where the optical element 525 forms an on-chip lens that is configured to steer light emitted from the side surface 510 to converge.

As with the optical system 400 of FIG. 4, the optical system 500 includes a slab waveguide 515 and an output waveguide 503. For example, the slab waveguide 515 and the output waveguide 503 may be defined in a waveguide layer of a photonic integrated circuit, such as described previously, wherein the side surface 510 is an output facet of the photonic integrated circuit. The output waveguide 503 has a waveguide core 520 (defined by a pair of light confining regions 505 such as discussed previously) that is connected to the slab waveguide 515.

In this way, the output waveguide 503 terminates before reaching the side surface 510. Accordingly, input light received by the output waveguide 503 is passed to the slab waveguide 515 (which acts as a free propagation region), in which the input light, the boundaries of which are represented by rays 507a, 507b, will diverge as it approaches the optical element 525.

The optical element 525 of optical system 500 is positioned and/or curved such that as the diverging input light passes through the optical element 525, the optical element 525 generates an output light beam (the boundaries of which are represented by outermost rays 507d and 507e) that is converging. As with the optical element 425 of FIG. 4, the optical element 525 will act as a positive lens (i.e., a lens having positive refractive power), except that the curvature of the optical element 525 and/or distance between the output waveguide and the optical element 525 is adjusted (as compared to the optical element 425) to steer the output light to converge. The optical element 525 has a convex shape, such as a curve with a positive radius of curvature, and may be manufactured in any suitable manner as described previously. As discussed herein, this focusing occurs in the plane of the slab waveguide 515, and may reduce the number, size and/or complexity of free space optics that would otherwise be used to focus light in the slow axis.

Figure 17A:
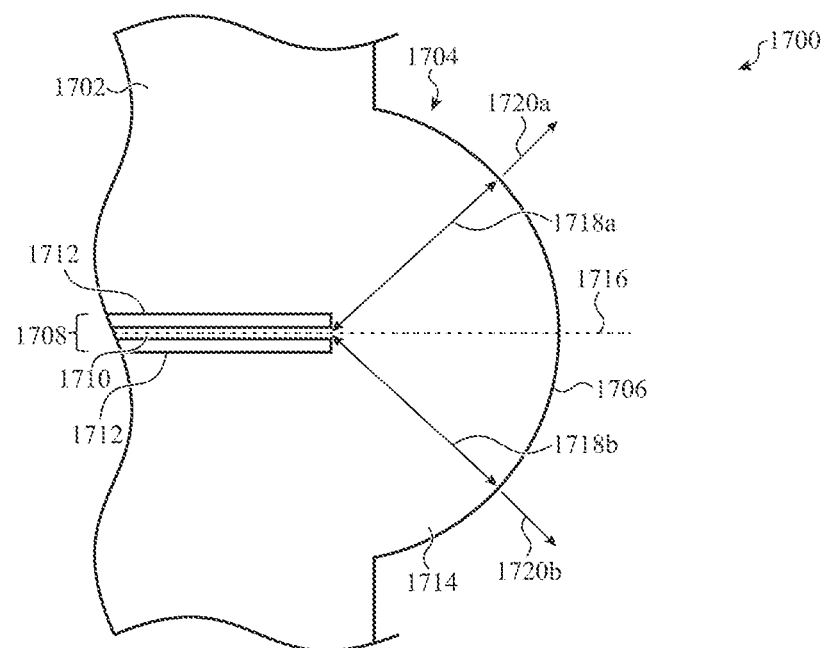
FIGS. 17A and 17B show top views of variations of photonic integrated circuits having optical elements configured as cylindrical lens.

In other variations, it may be undesirable to significantly change the beam profile of the input light as it exits a side surface of a photonic integrated circuit. Accordingly, in some variations, an output side surface of a photonic integrated circuit may include an optical element configured as a cylindrical lens with a semi-circular curve, such that the cylindrical lens has a constant radius of curvature. FIG. 17A shows one such variation of a photonic integrated circuit 1700 (which may be part of the optical systems described herein). While only a waveguide layer 1702 of the photonic integrated circuit 1700 is shown in FIG. 17A, the photonic integrated circuit 1700 may also include a substrate, a lower cladding layer, and optionally an upper cladding layer as discussed previously.

The photonic integrated circuit 1700 includes a side surface 1704 that serves as an output facet through which light may be emitted from the photonic integrated circuit 1700. The side surface 1704 defines an optical element 1706 that forms a cylindrical on-chip lens having a semi-circular curve. The photonic integrated circuit further includes an output waveguide 1708 and a slab waveguide 1714 defined in the waveguide layer 1702. Specifically, the output waveguide 1708 includes a waveguide core 1710 bounded and defined by a pair of light confining regions 1712. The output waveguide 1708 terminates into the slab waveguide 1714 at a junction between the output waveguide 1708 and the slab waveguide 1714.

As described previously, when input light is introduced into the slab waveguide 1714 from the output waveguide 1708, this input light (the boundaries of which are represented by arrows 1718a and 1718b) will diverge within the slab waveguide 1714. If the junction between the output waveguide 1708 and the slab waveguide 1714 is positioned at the center of curvature of the optical element 1706, as shown in FIG. 17A, input light emitted from the output waveguide 1708 will not change its divergence as light exits the photonic integrated circuit 1700 through the optical element 1706. Specifically, when the input light is introduced into the slab waveguide 1714 from the output waveguide 1708, each ray within the input light will hit the optical element 1706 at normal incidence (assuming that the optical element 1706 is sized such that the input light reaches its far field before hitting the optical element 1706). As each ray hits the optical element 1706 at normal incidence, each ray continues along the same direction as it undergoes the refractive index change between the slab waveguide 1714 and the material (e.g., air) in contact with the side surface 1704. Accordingly, the optical element 1706 will generate output light (represented by outermost rays 1720a and 1720b) with the same beam divergence as the input light.

When a ray of light hits the optical element 1706 at normal incidence, back reflections caused as light exits slab waveguide 1714 will be retroreflected back to the output waveguide 1708. In effect, the back-reflected light (the boundaries of which are also represented by arrows 1718a and 1718b) is focused by the optical element 1706 at the entrance of the output waveguide 1708. To mitigate this, an output waveguide may be positioned such that it is laterally offset with respect to the center of curvature of the semicircular curve. As used herein, an output waveguide is considered to be "laterally offset" relative to the center of curvature of an optical element when the light beam exiting the output waveguide (i.e., the input light in the slab waveguide) is centered along a line that does not intersect the center of curvature of the optical element. In the variation shown in FIG. 17A, the input light exiting the output waveguide 1708 is centered on a line 1716 that intersects the center of curvature of the optical element 1706, and thus the output waveguide 1708 is not laterally offset relative to the optical element 1706.

Figure 17B:
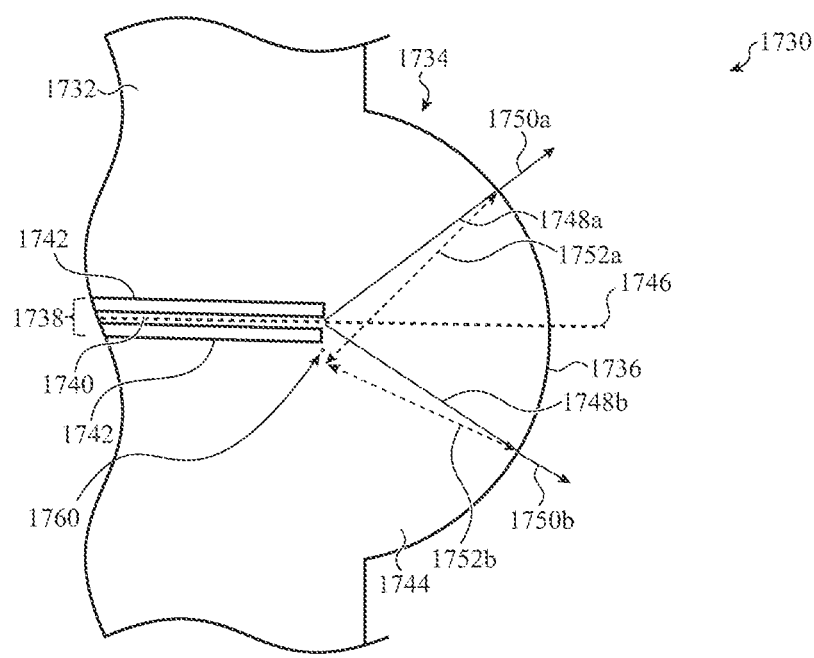

FIG. 17B shows another variation of a photonic integrated circuit 1730 that includes a waveguide 1738 that is laterally offset relative to an optical element 1736. As with the photonic integrated circuit 1700 of FIG. 17B, the photonic integrated circuit 1730 may be part of the optical systems described herein, and may include a substrate, a lower cladding layer, a waveguide layer 1732 and optionally an upper cladding layer (though only waveguide layer 1732 is depicted in FIG. 17B).

The photonic integrated circuit 1730 includes a side surface 1734 that serves as an output facet through which light may be emitted from the photonic integrated circuit 1730. The side surface 1734 defines an optical element 1736 that forms a cylindrical on-chip lens having a semi-circular curve. The photonic integrated circuit further includes an output waveguide 1738 and a slab waveguide 1744 defined in the waveguide layer 1732. Specifically, the output waveguide 1738 includes a waveguide core 1740 bounded and defined by a pair of light confining regions 1742. The output waveguide 1738 terminates into the slab waveguide 1744 at a junction between the output waveguide 1738 and the slab waveguide 1744.

Unlike the output waveguide 1708 of FIG. 17A, the output waveguide 1738 of photonic integrated circuit 1730 is positioned such that the junction between the output waveguide 1708 and the slab waveguide 1714 is not positioned at the center of curvature 1760 of the optical element 1706. In the variation shown in FIG. 17B, the output waveguide 1738 is laterally offset relative to the center of curvature 1760 of the optical element 1736. Specifically, the output waveguide 1738 is positioned such that output waveguide 1738 introduces a beam of input light (the outer bounds of which are represented by rays 1748a, 1748b) into the slab waveguide 1744 such that the beam is centered along a line 1746 that does not intersect the center of curvature 1760 of the optical element 1736.

When the output waveguide 1738 is laterally offset relative to the center of curvature 1760, various rays of the input light will hit the optical element 1736 at non-perpendicular angles. As a result, the back reflections caused as these rays exit the slab waveguide 1744 are not retroreflected back to the output waveguide 1738. Instead, the back reflections (the outer bounds of which are represented in FIG. 17B by rays 1752a, 1752b) are effectively focused to a different point in the slab waveguide 1744. If the output waveguide 1738 is sufficiently laterally offset relative to the center of curvature 1760 of the optical element 1736, none of the back reflections from the side surface 1734 will directly couple into the output waveguide 1738.

As the input light reaches the optical element 1736, the side surface 1734 generates a beam of output light (the boundaries of which are represented by rays 1750a and 1750b). While laterally shifting the output waveguide 1738 may adjust the direction and/or level of divergence of the output light beam (as compared to the beam generated by the side surface 1704 in FIG. 17A), the output light beam may still be within system specifications for a given optical system while realizing the reduced back-reflections as described immediately above. Indeed, in some instances the output waveguide 1738 may be positioned to intentionally increase or decrease the divergence of the output beam, such as will be described herein with respect to FIGS. 18A-18C.

Figure 6:
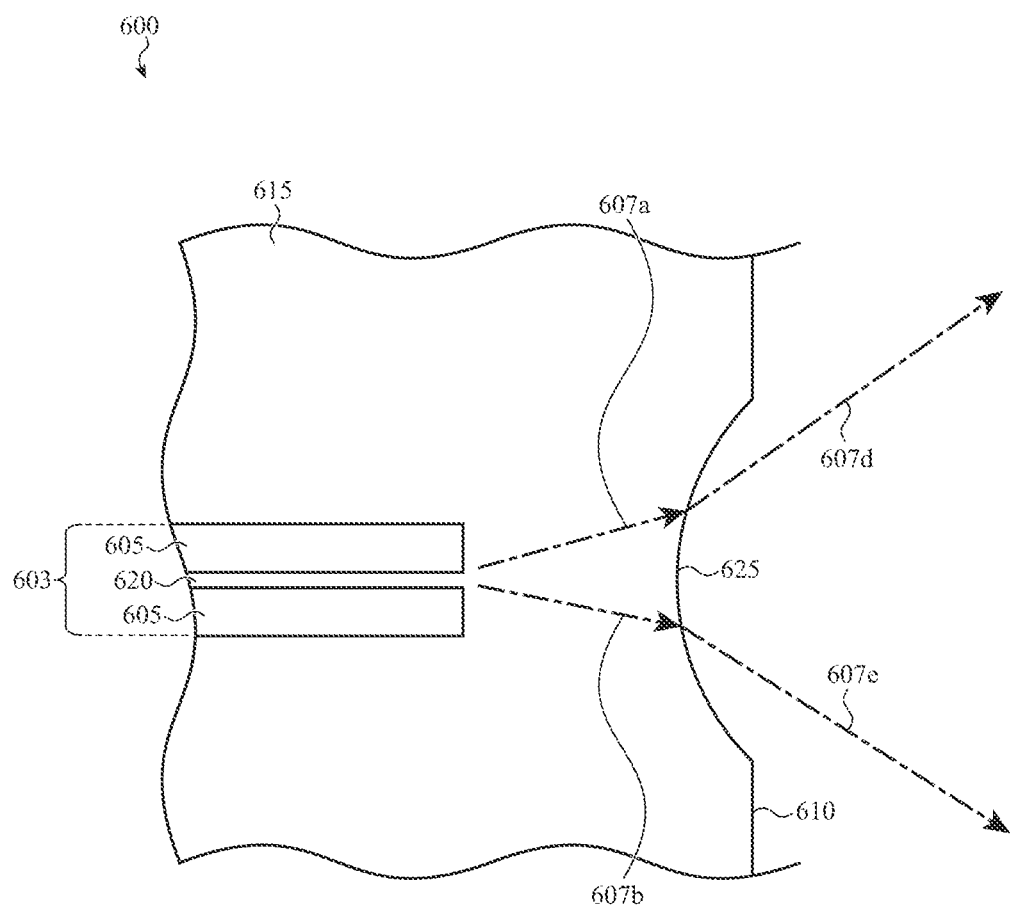
FIG. 6 shows a top view of an example of an optical system with an optical element that steers the output light to diverge.

While the optical elements described previously with respect to FIGS. 4, 5, 17A, and 17B are configured as on-chip lenses having a convex shape, in other variations an optical element may be configured as an on-chip lens having a concave shape. For example, FIG. 6 is an example of an optical system 600 that has a side surface 610 that defines an optical element 625, where the optical element 625 forms an on-chip lens. In this variation, the optical element 625 is configured to increase the divergence of light as it is emitted from the side surface 610.

The optical system 600 includes a slab waveguide 615 and an output waveguide 603. For example, the slab waveguide 615 and the output waveguide 603 may be defined in a waveguide layer of a photonic integrated circuit, such as described previously, such that the side surface 610 forms an output facet of the photonic integrated circuit. The output waveguide 603 has a waveguide core 620 (defined by a pair of light confining regions 605, such as discussed previously) that is connected to the slab waveguide 615. In this way, the output waveguide 603 terminates before reaching the side surface 610. Accordingly, input light received by the output waveguide 603 is passed to the slab waveguide 615 (which acts as a free propagation region), in which the input light, the boundaries of which are represented by rays 607a, 607b will diverge as it approaches the optical element 625.

As the input light passes through the optical element 625 to generate an output light beam, the optical element 625 will act as a negative lens (i.e., a lens having negative refractive power) to increase the divergence of the output light (the boundaries of which are represented by rays 607d and 607e). This steering occurs within the plane of the waveguide layer defining the slab waveguide 615 (i.e., the slow axis), and the output light may also diverge in a fast axis as discussed previously. In the variation shown in FIG. 6, the optical element 625 has a concave shape, such as a curve with a negative radius of curvature (i.e., curves away the output waveguide 603). As discussed herein, the optical element 625 reduces the number, size, and/or complexity of free space optics that would otherwise be used to focus in the slow axis.

Figure 18A:
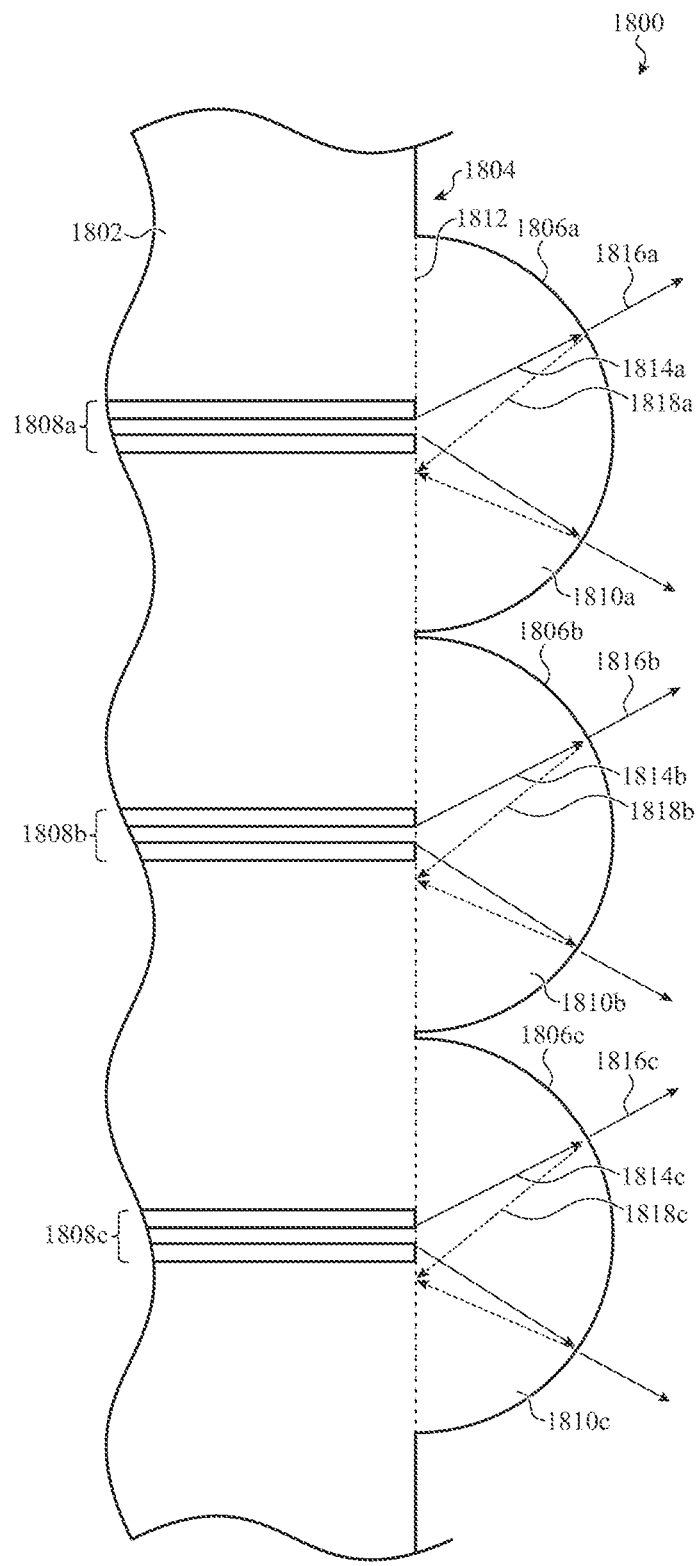
FIGS. 18A-18C show top views of variations of photonic integrated circuits having multiple optical elements.

While the optical systems and photonic integrated circuits described herein with respect to FIGS. 4-6, 17A, and 17B are each shown as having a side surface with a single optical element formed as an on-chip lens, it should be appreciated that the photonic integrated circuits (and associated optical systems) described herein may include multiple optical elements formed in a side surface thereof. For example, FIG. 18A shows one such variation of a photonic integrated circuit 1800. While only a waveguide layer 1802 of the photonic integrated circuit 1800 is shown in FIG. 18A, the photonic integrated circuit 1800 may also include a substrate, a lower cladding layer, and optionally an upper cladding layer as discussed previously.

The photonic integrated circuit 1800 includes a side surface 1804, which acts as an output facet through which light may be emitted from the photonic integrated circuit 1800. The side surface 1804 defines a plurality of optical elements 1806a-1806c, each of which forms an on-chip lens. While the plurality of optical elements 1806a-1806c is shown in FIG. 18A as having three optical elements (i.e., a first optical element 1806a, a second optical element 1806b, and a third optical element 1806c), the plurality of optical elements 1806a-1806c may include any suitable number of optical elements (e.g., two, three, four, five, ten, twenty, or thirty or more optical elements). Each of these optical elements may be configured as any of the on-chip lenses as described herein, and thus the plurality of optical elements 1806a-1806c may include any combination of on-chip lenses as may be desired. The plurality of optical elements 1806a-1806c may each have the same shape, or alternatively, some or all of the plurality of optical elements 1806a-1806c may have different shapes.

The photonic integrated circuit 1800 further includes a plurality of output waveguides 1808a-1808c and a plurality of slab waveguides 1810a-1810c defined in the waveguide layer 1802. Each output waveguide of the plurality of output waveguides 1808a-1808c and each slab waveguide of the plurality of slab waveguides 1810a-1810c are associated with a corresponding optical element of the plurality of optical elements 1806a-1806c, such that each optical element receives light from one of the plurality of output waveguides 1808a-1808c (via a corresponding slab waveguide of the plurality of slab waveguides 1810a-1810c) and generates a corresponding beam of output light. Each optical element, its corresponding output waveguide, and its corresponding slab waveguide collectively form an emitter capable of generating a beam of output beam. Accordingly, the photonic integrated circuit 1800 includes a plurality of emitters, each of which is capable of emitting a corresponding beam of light through the side surface 1804 of the photonic integrated circuit 1800. The side surface 1804 may emit a plurality of individual beams of output light, which may collectively form a larger beam of output light.

In the variation shown in FIG. 18A, the plurality of output waveguides 1808a-1808c includes a first output waveguide 1808a, a second output waveguide 1808b, and a third output waveguide 1808c. Similarly, the plurality of slab waveguides 1810a-1810c include a first slab waveguide 1810a, a second slab waveguide 1810b, and a third slab waveguide 1810c. It should be appreciated the plurality of slab waveguides 1810a-1810c may be different portions of a common slab waveguide such that the slab waveguides 1810a-1810c are optically connected to each other (such as shown in FIG. 18A), or may be optically separated (e.g., via intervening light confining regions) such that light is unable to travel between the plurality of slab waveguides 1810a-1810c.

The first output waveguide 1808a terminates into the first slab waveguide 1810a at a junction between first output waveguide 1808a and the first slab waveguide 1810a. As described previously, when a beam of input light 1814a is introduced into the first slab waveguide 1810a from the first output waveguide 1808a, this input light 1814a will diverge within the first slab waveguide 1810a. The input light 1814a passes through the first optical element 1806a to generate a first beam of output light 1816a. The second output waveguide 1808b, second slab waveguide 1810b, and second optical element 1806b may be similarly configured to generate a second beam of output light 1816b from a beam of input light 1814b introduced into the second slab waveguide 1810b from the second output waveguide 1808b. The third output waveguide 1808c, third slab waveguide 1810c, and third optical element 1806c generate a third beam of output light 1816c from a corresponding beam of input light 1814c in the same manner.

In the variation shown in FIG. 18A, the plurality of optical elements 1806a-1806c are each configured as a cylindrical lens with a semi-circular curve. In some of these variations, each of the plurality of output waveguides 1808a-1808c are laterally offset from a center of curvature of its corresponding optical element. This may reduce or prevent back reflections from reaching the plurality of output waveguides 1808a-1808c as light passes through the corresponding optical elements 1806a-1806c, such as described herein with respect to the photonic integrated circuit 1730 of FIG. 17B.

In some variations, each of the plurality of emitters has the same configuration. In these variations, each emitter has the same relative size, positioning, and orientation of its corresponding optical element, output waveguide, and slab waveguide. Specifically, each of the plurality of output waveguides 1808a-1808c has the same position and orientation relative to the corresponding optical element of the plurality of optical elements 1806a-1806c. Additionally, each of plurality of optical elements 1806a-1806c has the same shape, and thus the beams of output light 1816a-1816c generated by the plurality of emitters will have the same shape and direction. In other variations, different emitters may have different configurations. For example, at least some of the plurality of optical elements 1806a-1806c may have different shapes (e.g., to alter the shape or direction of the corresponding beams of output light). Additionally or alternatively, some of the plurality of output waveguides 1808a-1808c will have different positions and/or orientations relative to their corresponding optical elements, and thus will generate beams of output light having different shapes and/or directions. Accordingly, these positions and orientations may be adjusted within each of the plurality of output waveguides 1808a-1808c to tailor the shape of the overall beam of light collectively generated by the plurality of optical elements 1806a-1806c.

In the variation shown in FIG. 18A, the junctions between the plurality of output waveguides 1808a-1808c and their corresponding slab waveguides 1810a-1810c are aligned with the center of curvatures (not shown) of the plurality of optical elements 1806a-1806c. This is represented by line 1812, which intersects the centers of curvature of each of the plurality of optical elements 1806a-1806c in FIG. 18A. When the junction is positioned along line 1812 and laterally offset from the center of curvature of the corresponding optical element, back-reflected light from a corresponding optical element (e.g., back-reflected light 1818a for the first optical element 1806a, back-reflected light 1818b for the second optical element 1806b, and back-reflected light 1818c for the third optical element 1806c) will be focused to a point that also falls along line 1812, but on an opposite side of the center of curvature. Accordingly, these junctions may be positioned such that back-reflected light does not enter the plurality of output waveguides 1808a-1808c as discussed previously.

Figure 18B:
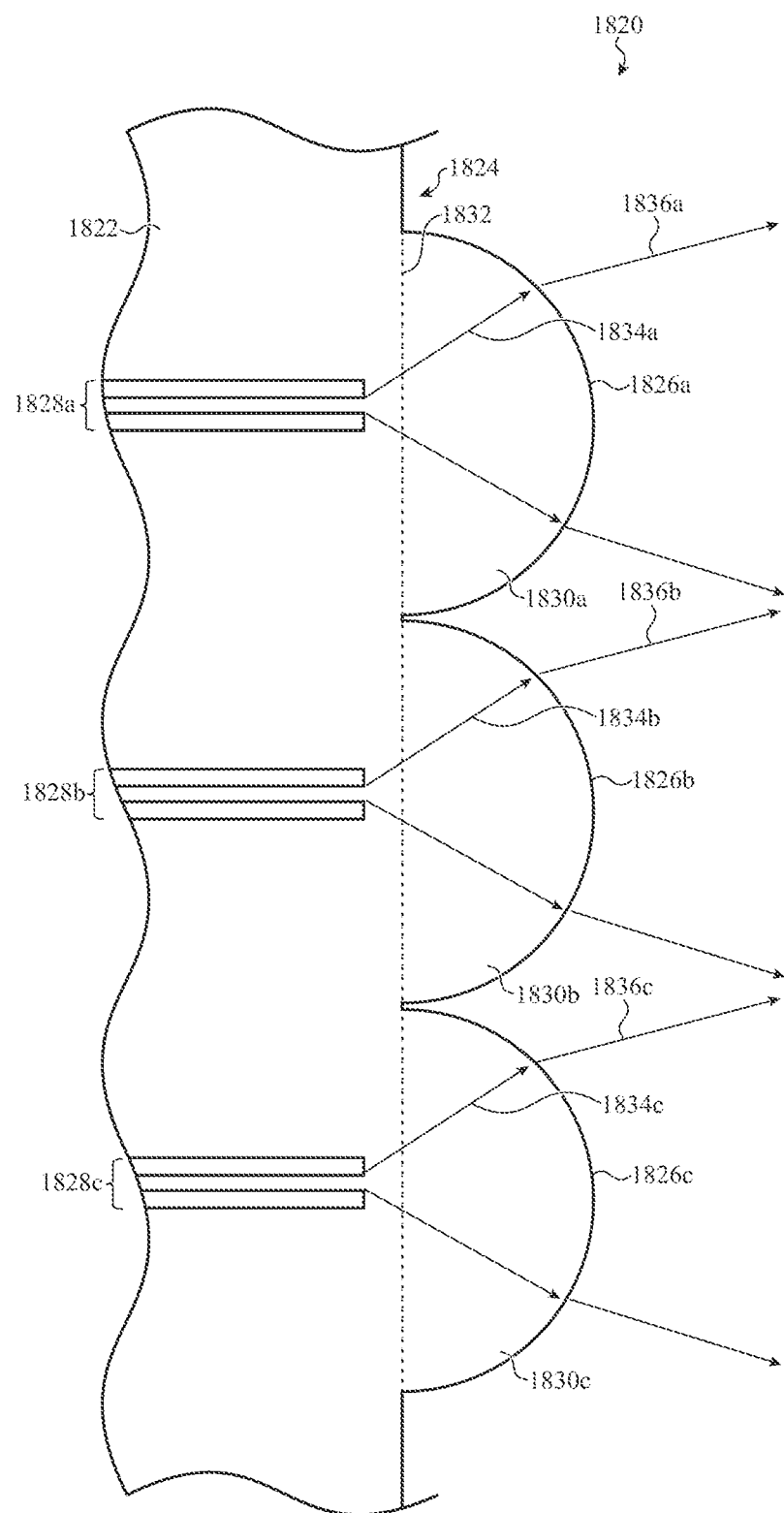

In other instances, the junctions between an output waveguide and a corresponding slab waveguide are not aligned with the center of curvature of the semi-circular curve of a corresponding optical element, which may be used to increase or decrease the divergence of the output light as it exits the side surface of a photonic integrated circuit. For example, FIG. 18B shows another variation of a photonic integrated circuit 1820. Specifically, FIG. 18B shows a waveguide layer 1822 of the photonic integrated circuit 1820, which includes a side surface 1824 that defines a plurality of optical elements (including a first optical element 1826a, a second optical element 1826b, and a third optical element 1826c), a plurality of output waveguides (including a first output waveguide 1828a, a second output waveguide 1828b, and a third output waveguide 1828c), and a plurality of slab waveguides (including a first slab waveguide 1830a, a second slab waveguide 1830b, and a third slab waveguide 1830c). These components collectively form a plurality of emitters as described previously. The side surface 1824 acts as an output facet through which light may be emitted from the photonic integrated circuit 1820.

The photonic integrated circuit 1820 may be configured the same as the photonic integrated circuit 1800 of FIG. 18A, except that each of the plurality of output waveguides 1828a-1828c terminates behind the center of curvature of its corresponding optical element (as represented by line 1832, which intersects the centers of curvature of each of the plurality of optical elements 1826a-1826c in FIG. 18B). In other words, the junction between an output waveguide and its corresponding slab waveguide is positioned such that the center of curvature of the corresponding optical element is positioned between the junction and the optical element. This may result in beams of output light that are slightly collimated (i.e., have less divergence) than their corresponding beams of input light. For example, when the first output waveguide 1828a introduces a beam of input light 1834a into the first slab waveguide 1830a (i.e., at a junction behind line 1832) the beam of input light 1834a will be partially collimated as it passes through the first optical element 1826a. As a result, the first optical element 1826a will generate a first beam of output light 1836a with less divergence than the beam of input light 1834a. Similarly, the second optical element 1826b may generate a second beam of output light 1836b with less divergence than a corresponding beam of input light 1834b, and the third optical element 1826c may generate a third beam of output light 1836c with less divergence than a corresponding beam of input light 1834c. It should be appreciated that each of the plurality of output waveguides 1828a-1828c may laterally offset from a center of curvature of the corresponding optical element. This may result in back-reflected light (not shown) that is focused at a point on an opposite side of line 1832, but the plurality of output waveguides 1828a-1828c may still be positioned such that the back-reflected light is not coupled into the plurality of output waveguides 1828a-1828c.

Figure 18C:
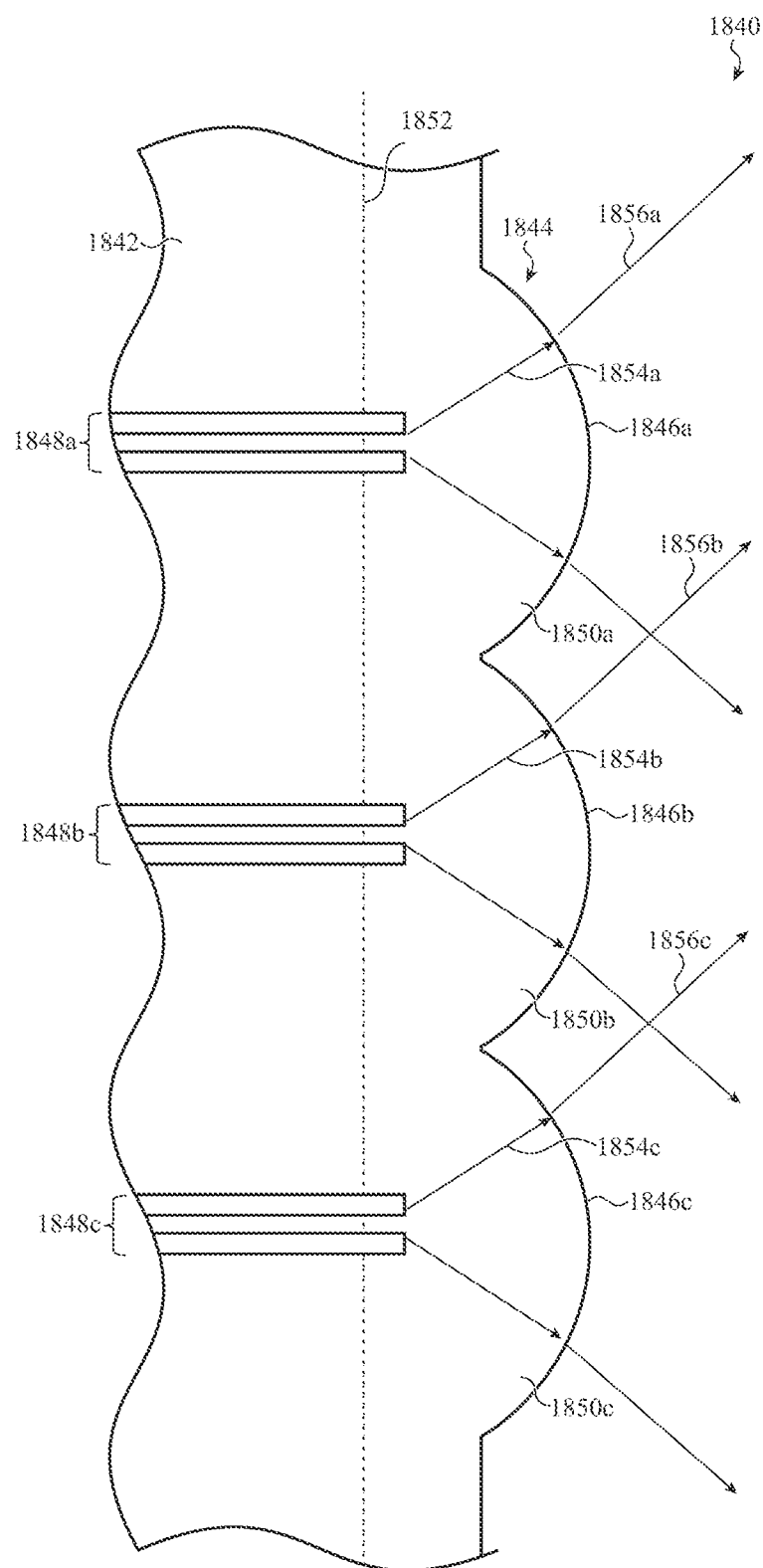

FIG. 18C shows yet another variation of a photonic integrated circuit 1840. Specifically, FIG. 18C shows a waveguide layer 1842 of the photonic integrated circuit 1840, which includes a side surface 1844 that defines a plurality of optical elements (including a first optical element 1846a, a second optical element 1846b, and a third optical element 1846c), a plurality of output waveguides (including a first output waveguide 1848a, a second output waveguide 1848b, and a third output waveguide 1848c), and a plurality of slab waveguides (including a first slab waveguide 1850a, a second slab waveguide 1850b, and a third slab waveguide 1850c). These components collectively form a plurality of emitters as described previously. The side surface 1844 acts as an output facet through which light may be emitted from the photonic integrated circuit 1840.

The photonic integrated circuit 1840 may be configured the same as the photonic integrated circuit 1800 of FIG. 18A, except that a plurality of output waveguides 1848a-1428c each extends beyond and terminates in front of the centers of curvature of its corresponding optical element (as represented by line 1852, which intersects the centers of curvature of each of the plurality of optical elements 1846a-1846c in FIG. 18C). In other words, the junction between each output waveguide and its corresponding slab waveguide is positioned such that the junction is positioned between the corresponding optical element and its center of curvature. This may result in beams of output light that have increased divergence than their corresponding beams of input light. For example, when the first output waveguide 1848a introduces a beam of input light 1854a into the first slab waveguide 1850b (i.e., at a junction in front of line 1852), the beam of input light 1854a will diverge as it passes through the first optical element 1846a. As a result, the first optical element 1846a will generate a first beam of output light 1856a with more divergence than the beam of input light 1854b. Similarly, the second optical element 1846b may generate a second beam of output light 1856b with more divergence than a corresponding beam of input light 1854b, and the third optical element 1846c may generate a third beam of output light 1856c with more divergence than a corresponding beam of input light 1854c. It should be appreciated that each of the plurality of output waveguides 1848a-1848c may laterally offset from a center of curvature of the corresponding optical element. This may result in back-reflected light (not shown) that focused at a point on an opposite side of line 1852, but the plurality of output waveguides 1848a-1848c may still be positioned such that the back-reflected light is not coupled into the plurality of output waveguides 1848a-1848c.

Figure 18D:
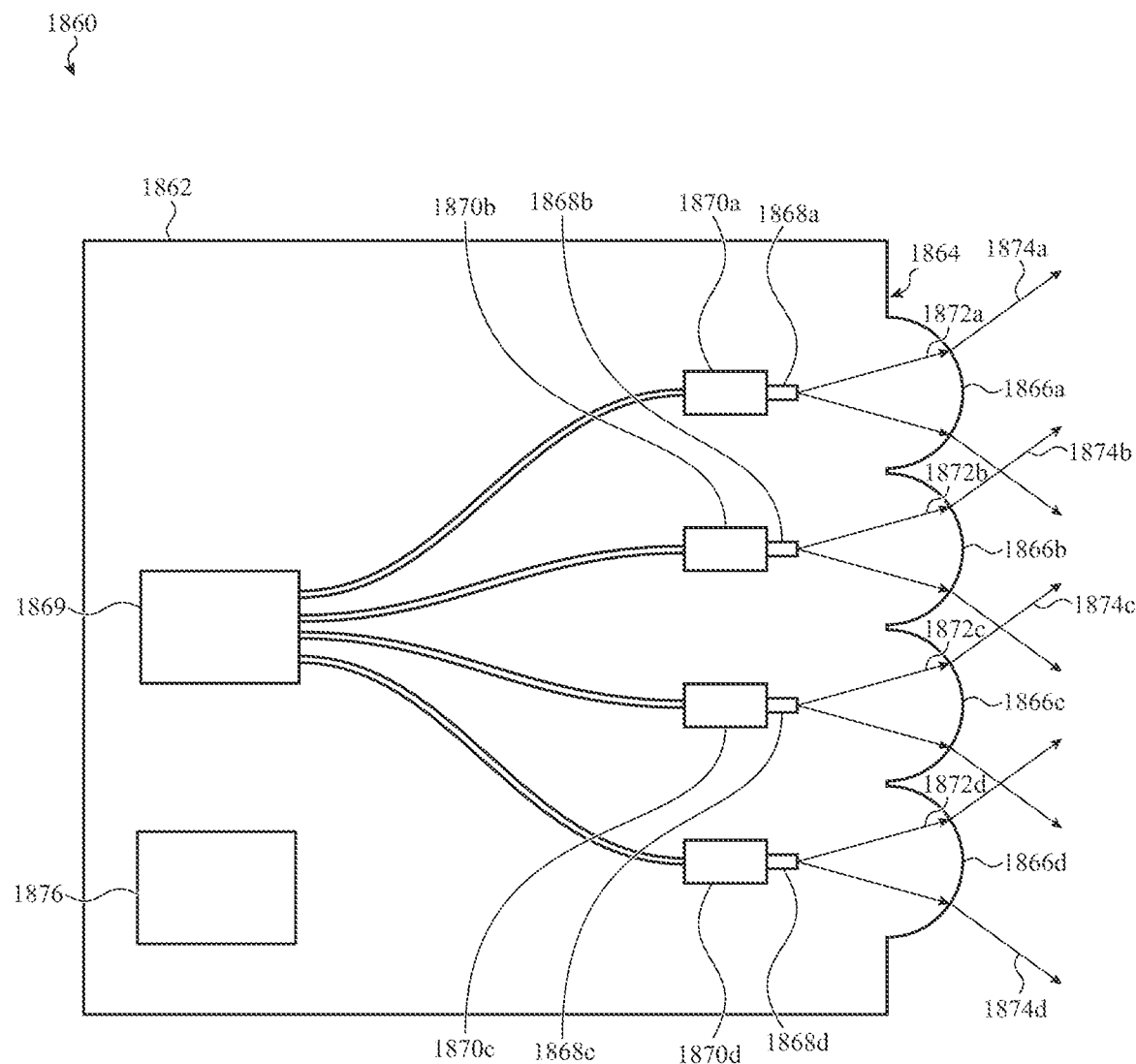
FIG. 18D shows a top view of a variation of an optical system that includes a photonic integrated circuit with multiple optical elements.

In instances where multiple output beams are generated using multiple emitters, it may be desirable to allow for individual control of some or all of the output beams. This may allow for adjustment of the overall illumination emitted from a photonic integrated circuit of the optical system. For example, the photonic integrated circuit may be able to selectively control the intensity, wavelength (or wavelengths), and/or phase of different output beams. FIG. 18D shows an example of an optical system 1860 with a photonic integrated circuit 1862 that is configured to emit multiple beams of output light via multiple emitters. Specifically, the photonic integrated circuit 1862 has a side surface 1864 that defines a plurality of optical elements 1866a-1866d. The side surface 1864 acts as an output facet of the photonic integrated circuit 1862. The plurality of optical elements 1866a-1866d includes four optical elements (e.g., a first optical element 1866a, a second optical element 1866b, a third optical element 1866c, and a fourth optical element 1866d), but it may include any suitable number of optical elements as described previously.

The photonic integrated circuit 1862 further includes a plurality of output waveguides 1868a-1868d, each of which is associated with a corresponding optical element of the plurality of optical elements 1866a-1866d, such as described herein with respect to the photonic integrated circuits of FIGS. 18A-18C. Specifically, a first output waveguide 1868a may direct a beam of input light 1872a to the first optical element 1866a to generate a first beam of output light 1874a, and a second output waveguide 1868b may direct a beam of input light 1872b to the second optical element 1866b to generate a second beam of output light 1874b. Similarly, a third output waveguide 1868c may direct a beam of input light 1872c to the third optical element 1866c to generate a third beam of output light 1874c, and a fourth output waveguide 1868d may direct a beam of input light 1872d to the fourth optical element 1866d to generate a fourth beam of output light 1874d. This may collectively form the plurality of emitters mentioned previously. Depending on the relative placement of the optical elements 1866a-1866d and divergence of the beams of output light 1874a-1874d, some or all of the beams of output light 1874a-1874d may at least partially overlap.

In some instances, the optical system 1860 may selectively control which of the emitters are emitting light (i.e., which optical elements 1866a-1866d are actively generating beams of output light), such that different combinations of beams of output light 1874a-1874d may be generated at different times. In these instances, individual emitters or groups of emitters may be individually controlled (e.g., by a controller as discussed herein) to generate light. Additionally or alternatively, the optical system 1860 may selectively control the intensity of these beams of output light 1874a-1874d, such that the intensity of light varies between different emitters. For example, the optical system 1860 may include a light source unit 1869, which can be configured in any manner as described previously. The light source unit 1869 is optically connected to each of the plurality of emitters. Specifically light source unit 1869 is optically connected to each of the plurality of output waveguides 1868a-1868d such that each of the beams of input light 1872a-1872d (and thereby the beams of output light 1874a-1874d) is originally generated by one or more light sources of the light source unit 1869. While the light source unit 1869 is shown in FIG. 18D as being incorporated into the photonic integrated circuit 1862, in other instances some or all of the light sources of the light source unit 1869 are separate from the photonic integrated circuit 1862 and arranged to couple light into the photonic integrated circuit 1862.

In some variations, the light source unit 1869 may control which of the output waveguides 1868a-1868d receive output light by selectively activating different light sources of the light source unit 1869. Additionally or alternatively, the photonic integrated circuit 1862 may include one or more additional optical components (e.g., optical switches, variable optical attenuators, combinations thereof, or the like) positioned between the light source unit 1869 and one or more of the output waveguides 1868a-1868d. These components can be controlled to determine whether light generated by the light source unit 1869 reaches a particular output waveguide of the plurality of output waveguides 1868a-1868d. The intensity of a given output light beam may similarly be adjusted, such as by changing the intensity of light generated by the light source unit 1869 and/or controlling how much of that light reaches a corresponding output waveguide.

As a result, the optical system 1860 may select (via the light source unit 1869 and/or any intervening components) which of the output waveguides 1868a-1868d will receive input light, and thus selects which optical elements 1866a-1866d will emit beams of output light. For example, the optical system 1860 may direct input light to all of the output waveguides 1868a-1868d, such that all of the emitters (and their respective optical elements) emit a corresponding beam of output light. At other times, the optical system 1860 may select a subset of the output waveguides 1868a-1868d, and may direct input light only to the selected output waveguides. In this way, only a corresponding subset of the emitters (and their respective optical elements) emit beams of output light. Depending on the design of the optical system 1860, the optical system may select different subsets of output waveguides 1868a-1868d at different times to change the selection of emitters that are emitting light.

Similarly, for any group of output waveguides and their corresponding optical elements (e.g., all of these elements or a subset thereof), the optical system 1860 may selectively control the intensity of input light provided to different output waveguides. In these instances, different subsets of the output waveguides 1868a-1868d may receive input light having different intensities such that different subsets of the optical elements 1866a-1866d generate beams of output light having different intensities. For example, a first subset of emitters (and their respective optical elements) may generate beams of output light having a first intensity while a second subset of emitters (and their respective optical elements) simultaneously generates beams of output light having a second intensity greater than the first intensity. Accordingly, different emitters may emit different intensities of light simultaneously, and, in some instances, may do so while other emitters are not actively emitting light.

Additionally or alternatively, the optical system 1860 may selectively control the wavelength (or wavelengths) of beams of output light emitted by each optical element, such that wavelength may vary between different emitters. Specifically, different subsets of the output waveguides 1868a-1868d may receive input light having different sets of wavelengths such that different subsets of emitters (and their respective optical elements) generate beams of output light having different sets of wavelengths. For example, the optical system 1860 may be controlled such that a first subset of the optical elements 1866a-1866d may generate a corresponding set of beams of output light, each of which has a first set of wavelengths. The optical system 1860 may be further controlled such that a second subset of the optical elements 1866a-1866d simultaneously generates a second set of beams of output light, each of which has a second set of wavelengths different than the first set of wavelengths. In these instances, the first and second sets of wavelengths are considered different so long as one set includes at least one wavelength of light not included in the other set.

In still other variations, the optical system 1860 may control the light emitted by each emitter, such that this phase may vary between different beams of output light. For example, the optical system 1860 shown in FIG. 18D includes a plurality of phase shifters 1870a-1870d, each of which is controllable to selectively adjust the phase of a corresponding output waveguide (i.e., emitters or groups of emitters may be individually controlled to emit light having different phases). For example, a first phase shifter 1870a is controllable to adjust the phase of input light carried by the first output waveguide 1868a, a second phase shifter 1870b is controllable to adjust the phase of input light carried by the second output waveguide 1868b, a third phase shifter 1870c is controllable to adjust the phase of input light carried by the third output waveguide 1868c, and a fourth phase shifter 1870*d* is controllable to adjust the phase of input light carried by the fourth output waveguide 1868*d*. This may allow each of the optical elements 1866*a*-1866*d* (or subsets thereof) to generate an output light beam having a unique phase relative to other output light beams generated by the optical elements 1866*a*-1866*d*. The plurality of phase shifters may include any suitable phase shifters, such as a thermo-optic phase shifters (that change the refractive index of a waveguide by changing a temperature of the waveguide), carrier-based phase shifters (that change the refractive index of a waveguide by changing the amount of charge carriers present in the waveguide), optomechanical phase shifters (that move a moveable structure relative to a waveguide to change the effective refractive index experienced by light traveling through the waveguide), combinations thereof, or the like.

Accordingly, different subsets of emitters may be controlled to emit output light having different phases. For example, a first subset of emitters (and their respective optical elements) may generate beams of output light having a first phase while a second subset of emitters (and their respective optical elements) simultaneously generates beams of output light having a second phase different than the first phase. Accordingly, different emitters may emit different phases of light simultaneously.

As shown in FIG. 18D, the optical system 1860 may include a controller 1876 that is configured to control the plurality of emitters. Specifically, the controller 1876 controls operation of the photonic integrated circuit 1862 to emit light from the side surface 1864 as described previously. Specifically, the controller 1876 may control the light source unit 1869 to cause the light source unit 1869 to generate light necessary to generate the beams of output light 1874*a*-1874*d* (or a subset thereof as selected by the optical system 1860). Additionally, the controller 1876 may control any intervening components as necessary to route light from the light source unit 1869 to the selected output waveguides. In variations where the optical system 1860 includes one or more phase shifters (such as the plurality of phase shifters 1870*a*-1870*d*), the controller 1876 may control these phase shifters to adjust the relative phase of the beams of output light 1874*a*-1874*d* as discussed previously. The controller 1876 may include any combination of software, hardware, and firmware as needed to perform these functions (including any of the method steps described herein), including, for example, one or more processors and/or application-specific integrated circuits (ASICs).

Figure 7:
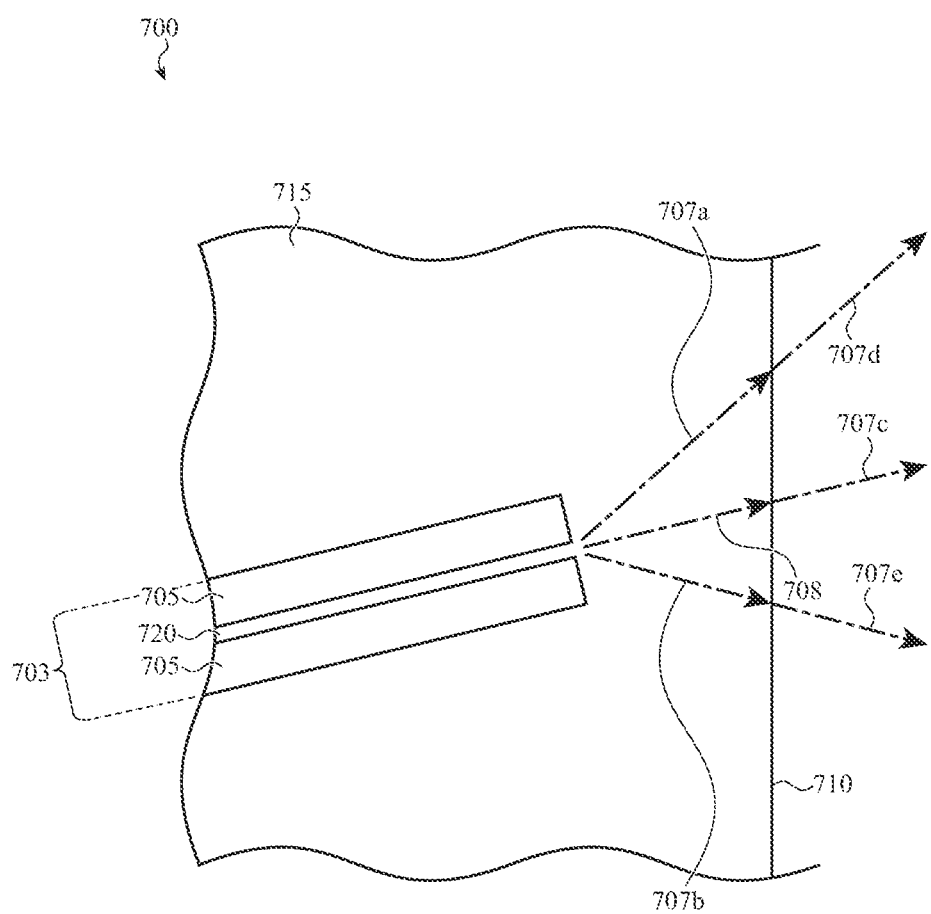
FIG. 7 shows a top view of an example of an optical system with a waveguide that is angled with respect to the output side.

In various embodiments of the photonic integrated circuits described herein, it may be desirable to angle an output waveguide such that it is not perpendicular to a side surface through which light exits the photonic integrated circuit. FIG. 7 is an example of an optical system 700 with an output waveguide 703 and a slab waveguide 715, where the output waveguide 703 is angled with respect to the output side 710 of the slab waveguide 715. In these instances, angling the output waveguide 703 may mitigate back-reflection of light 707 from the output side 710. The specific positioning depicted in FIG. 7 is for explanatory purposes only and the output waveguide 703 may be positioned at any appropriate angle that mitigates the back-reflection of light.

Specifically, the output waveguide 703 (which may include a waveguide core 720 that is defined at least partially by a pair of light confining regions 705 as discussed previously), may terminate at the slab waveguide 715, such that input light carried by the output waveguide 703 is passed to the slab waveguide 715. The output waveguide 703 is angled such that the beam of input light (the boundaries of which are represented by rays 707*a*, 707*b*) is similarly angled relative to the output side 710 of the slab waveguide 715. In these instances, a center of the beam of input light (represented by ray 708) hits the output side 710 at a non-normal incidence.

As the beam of input light passes through the output side 710 to generate a beam of output light (the boundaries of which are represent by rays 707*d*, and 707*e*, and further includes ray 707*c*), back-reflected light (not shown) may be returned to slab waveguide 715. Depending on the positioning and angle of the output waveguide 703, some or all of the back-reflected light many be directed away from the output waveguide 703. In instances where some back-reflected light returns to the output waveguide 703, it may have less intensity as compared to similar designs where the center of the beam of input light hits the output side 710 at a normal incidence. In some embodiments, the output side 710 may have an optical element etched into the profile of the output side 710, and the optical element may be any lens as described herein.

Figure 8:
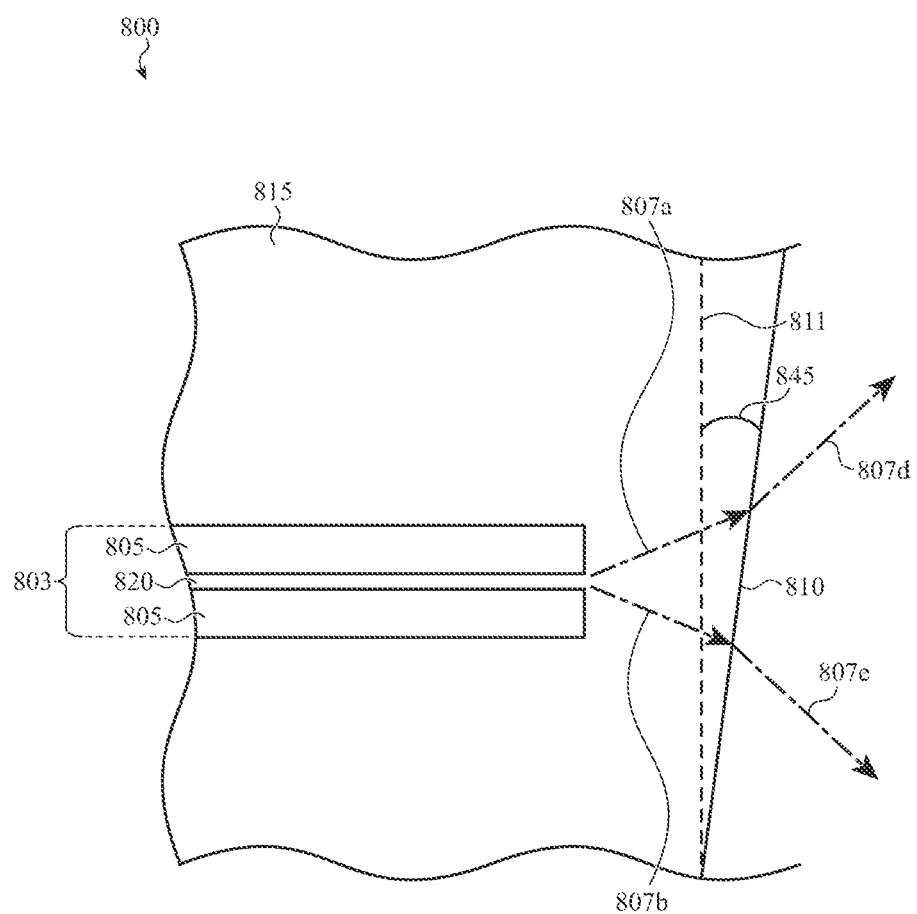
FIG. 8 shows a top view of an example of an optical system with an angled output side.

The relative angle between the output waveguide 703 and the output side 710 may be achieved in any suitable manner. For example, in the variation shown in FIG. 7, the output side 710 of the slab waveguide 715 may be a lateral surface of a photonic integrated circuit that is exposed by dicing of a wafer, in which case the output waveguide may be defined at an angle relative to this lateral surface. In instances where a portion of the photonic integrated circuit is etched to form the side surface (such as discussed herein with respect to FIGS. 16A-16C), this etching may create the relative angle between the side surface and output waveguide. FIG. 8 is one such example of an optical system 800 with an output waveguide 803 and a slab waveguide 815 with an angled output side 810. In these instances, the output side 810 may be etched from a lateral surface of a photonic integrated circuit to create a relative angle between the output waveguide 803 and the output side 810.

As shown in FIG. 8, plane 811 represents a plane that is parallel to a lateral surface of the photonic integrated circuit. The output waveguide 803 (which may include a waveguide core 820 defined by light defining regions 805 as discussed previously) is positioned normal to the plane 811. As a result, a beam of input light (the boundaries of which are represented by rays 807*a*, 807*b*) passed from the output waveguide 803 to the slab waveguide 815 is perpendicular to the plane 811 (i.e., a center of the beam of input light will intersect plane 811 at normal incidence). The output side 810 of the slab waveguide 815, however, may be etched so that it is angled relative to the lateral side surface at an angle 845. This creates a relative angle between the output waveguide 803 and the output side 810 that is similar to the relative angle described in relation to FIG. 7. Accordingly, as the input light passes through the output side 810 to generate a beam of output light (the boundaries of which are represented by rays 807*d*, 807*e*), some or all of the back-reflected light may be directed away from the output waveguide 803. As with any of the embodiments described herein, an anti-reflective coating may be applied to the output side 810.

Figure 9:
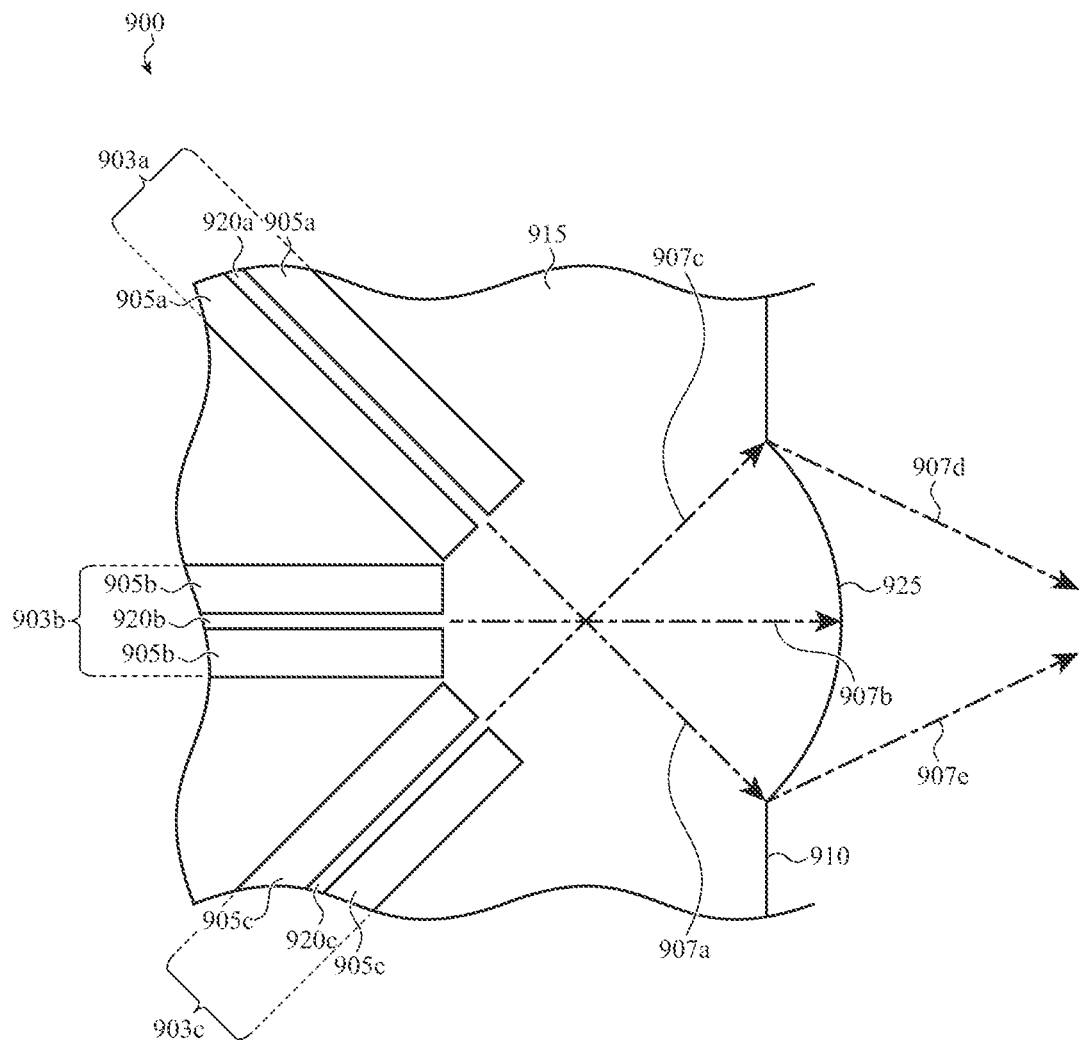
FIG. 9 shows a top view of an example of an optical system with multiple waveguides.

In some variations, it may be desirable for an optical element, such as an on-chip lens, to receive light from multiple output waveguides. For example, FIG. 9 shows an optical system 900 with an output side 910 that defines an optical element 925. The optical system further includes multiple output waveguides 903*a*, 903*b*, 903*c*, each of which is configured to direct light through the optical element 925 via slab waveguide 915.

The slab waveguide 915 and the plurality of output waveguides 903a-903c may be defined in a waveguide layer of a photonic integrated circuit, such as described previously, wherein the side surface 910 is a lateral side surface of the photonic integrated circuit. Each of the output waveguides 903a-903c may be configured as previously described (e.g., a first output waveguide 903a includes a first waveguide core 920a defined by a corresponding pair of light confining regions 905a, a second output waveguide 903b includes a second waveguide core 920b defined by a corresponding pair of light confining regions 905b, and a third output waveguide 903c includes a third waveguide core 920c defined by a corresponding pair of light confining regions 905c). The output waveguides 903a-903c pass beams of input light (represented as single rays 907a-907c) into the slab waveguide 915. The slab waveguide 915 acts as a free propagation region, allowing these beams to spread out before exiting the photonic integrated circuit through the optical element 925 to form a beam of output light (represented by rays 907d, 907e). Input light may be introduced into the output waveguides 903a-903c simultaneously, or may be introduced into different output waveguides at different times. The shape and/or direction of the output light may change depending on which output waveguides 903a-903c are transmitting input light into the slab waveguide 915.

The optical element 925 may be configured in any suitable manner as described herein. For example, the optical element 925 may be configured as an on-chip lens. Furthermore, the multiple output waveguides 903a-903c may be positioned at any suitable positions and angles relative to each other and relative to the optical element 925 as may be desired. For example, the output waveguides 903a-903c may be positioned at the same distance from the output side 910, or may be positioned at different distances from the output side 910.

Figure 10:
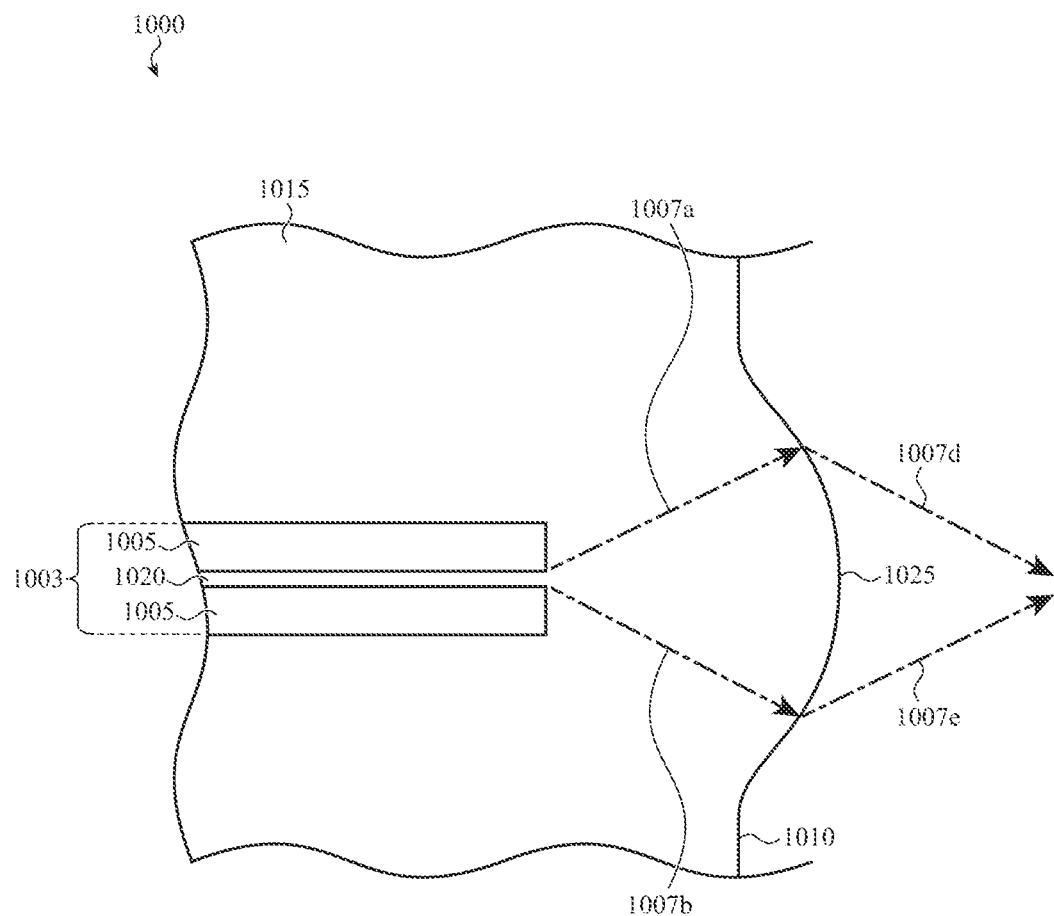
FIG. 10 shows a top view of an example of an optical system with an aspheric shaped lens.

FIG. 10 is an example of an optical system 1000 that includes an output waveguide 1003 and a slab waveguide 1015 with output side 1010, where the output side 1010 (which may be a side surface of a photonic integrated circuit) defines an optical element 1025. In this variation, the optical element 1025 is shaped to form an aspheric on-chip lens. Unlike the optical elements 1706 and 1736 of FIGS. 17A and 17B, the optical element 1025 lens does not have a semi-circular curve. Instead the radius of curvature of the vertical face of the optical element 1025 varies from the center of the optical element 1025 to either end. The output waveguide 1003 (which may include a waveguide core 1020 defined by a pair of confining regions 1005) may pass input light into the slab waveguide 1015. This input light (the boundaries of which are represented by rays 1007a, 1007b) passes through the optical element 1025 to generate a beam of output light (the boundaries of which are represented by rays 1007d, 1007e). In the variation shown in FIG. 10, the optical element is shaped such that it steers the beam of output light to converge. In these instances, the converging light may converge to a smaller spot than when a spherical lens is used. Thus, fewer wavefront errors may result when using an aspheric lens as opposed to a spherical lens.

Figure 11:
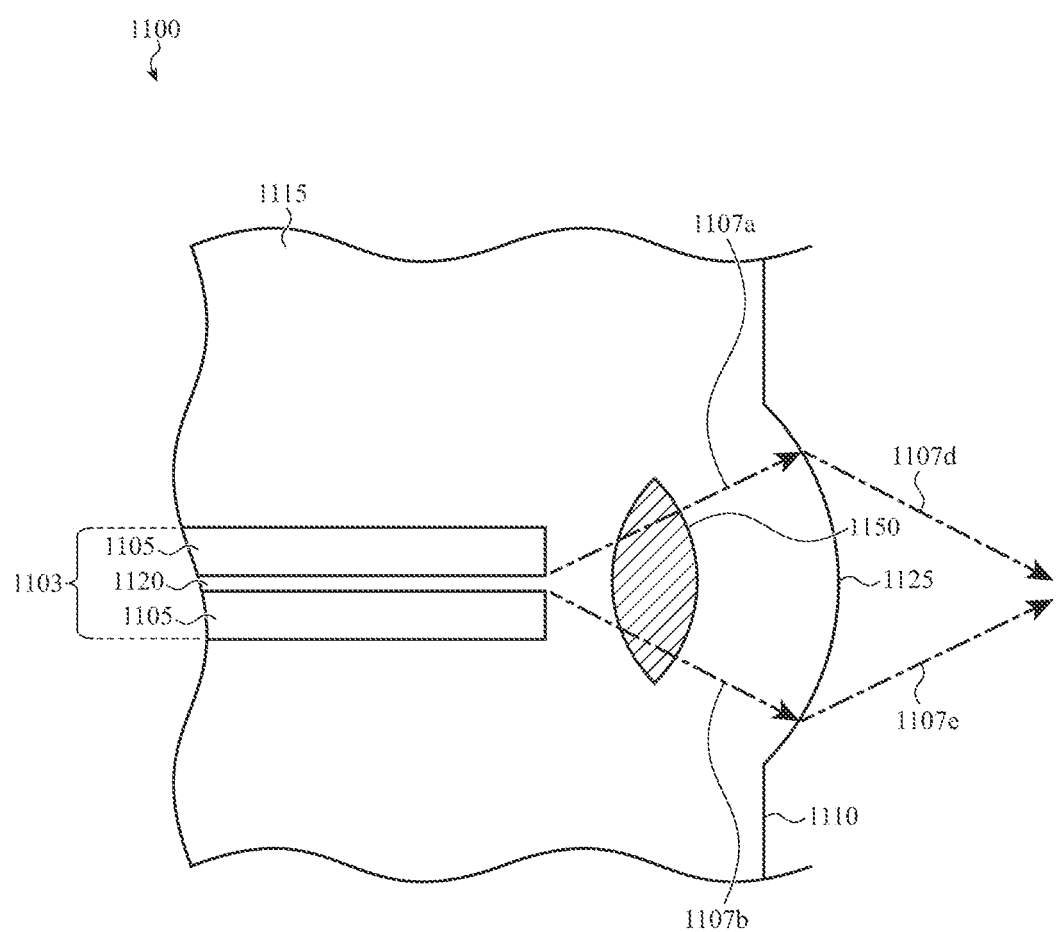
FIG. 11 shows a top view of an example of an optical system with a partially etched region between the waveguide and the output side.
Figure 12:
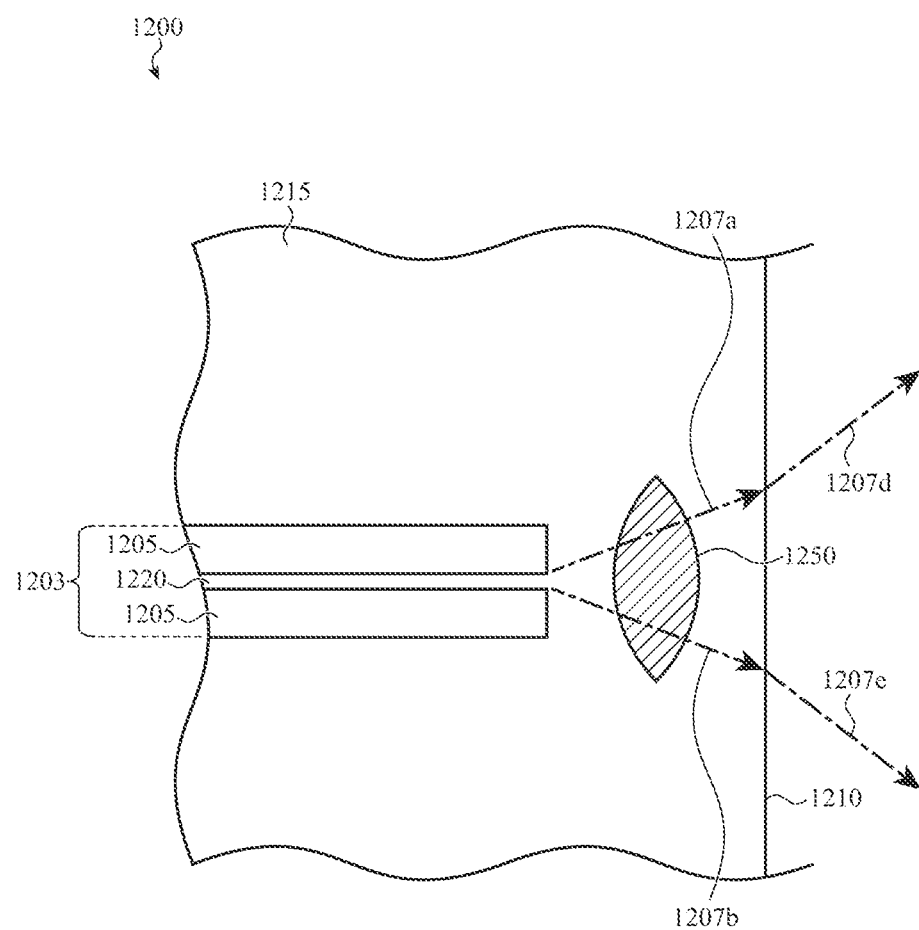
FIG. 12 shows a top view of an example of an optical system with a partially etched region between the waveguide and the optical element.

FIGS. 11 and 12 are examples of optical systems that include a partially etched region positioned between an output waveguide and an output side of a slab waveguide (which may form a output facet of a photonic integrated circuit). The partially etched region may act as a lens between the output waveguide and the output side, which allows for the input light to be redirected before it reaches the output side. Specifically, FIG. 11 shows an optical system 1100 with a partially etched region 1150 between an output waveguide 1103 and an output side 1110 that defines an optical element 1125. FIG. 12 shows an optical system 1200 with a partially etched region 1250 between an output waveguide 1203 and an output side 1210 that does not include an optical element.

Similar to previous embodiments, in FIG. 11 the output waveguide 1103 includes a waveguide core 1120 that is bounded and defined by a pair of light confining regions 1105, and terminates at a junction with a slab waveguide 1115. Input light (the boundaries of which are represented by rays 1107a and 1107b) that is introduced into the slab waveguide 1115 from the output waveguide 1103 will pass through the partially etched region 1150 before reaching the output side 1110 of the slab waveguide 1115 (which may form an output facet of a photonic integrated circuit). Specifically, the input light may pass through the optical element 1125 to generate an output beam (the boundaries of which are represented by rays 1107d, 1107e), such as described previously. Depending on the shape of the partially etched region 1150, the partially etched region 1150 may change the divergence and/or redirect the beam of input light as it passes through the partially etched region. For example, in the variation shown in FIG. 11, the partially etched region 1150 may partially focus the input light before it reaches the optical element 1125. In this way, the partially etched region 1150 and the optical element 1125 may collectively form a two lens system to achieve a desired shape and direction of the output light emitted form the optical element 1125.

The partially etched region 1150 is illustrated in FIG. 11 as oval, but may be any shape such as, but not limited to, circular, square, rectangular, trapezoidal, asymmetrical, or the like. The partially etched region 1150 may be etched during a different process step than the etching step used to form the optical element 1125, as these components may be etched to two different depths. That is, the partially etched region 1150 may be a shallower etch than the etch used to define the optical element 1125. The partially etched region 1150 may be filled with an additional material and may have a different refractive index than the surrounding slab waveguide 1115. For example, the partially etched region 1150 may be configured such that this additional material is positioned on a lower cladding layer (i.e., the cladding layer on which the waveguide layer defining the slab waveguide 1115 is formed). In instances where the photonic integrated circuit includes an upper cladding layer, this additional material may be positioned underneath the upper cladding layer. The upper and/or lowing cladding layers may help to keep light passing through the partially etched region confined within the plane of the waveguide layer.

The optical system 1200 of FIG. 12 may function similarly to the optical system 1100, except that the output side 1210 does not include an optical element. Specifically the output waveguide 1203 includes a waveguide core 1220 that is bounded and defined by a pair of light confining regions 1205, and terminates at a junction with a slab waveguide 1215. Input light (the boundaries of which are represented by rays 1207a and 1207b) that is introduced into the slab waveguide 1215 from the output waveguide 1203 will pass through the partially etched region 1250 before reaching the output side 1210 of the slab waveguide 1215 (which may be a side surface of a photonic integrated circuit). Specifically, the input light may pass through the output side 1210 to generate an output beam (the boundaries of which are represented by rays 1207d, 1207e), such as described previously. Depending on the shape of the partially etched region 1250, the partially etched region 1250 may change the divergence and/or redirect the beam of input light as it passes through the partially etched region. The partially etched region 1250 may be configured in any manner as described herein with respect to FIG. 11.

Figure 13:
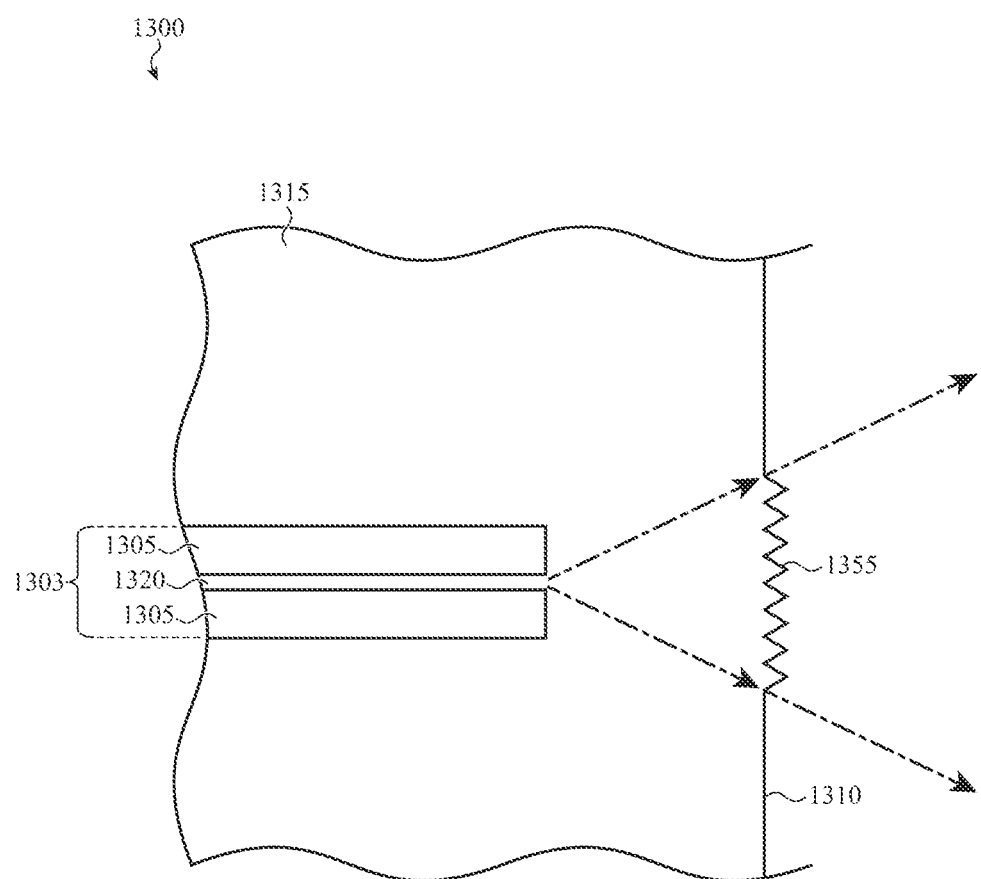
FIG. 13 shows a top view of an example of an optical system with a diffraction grating on the output side of the slab waveguide.

FIG. 13 is an example of an optical system 1300 with a diffraction grating 1355 on the output side 1310 of the slab waveguide 1315. The light may propagate through the output waveguide 1303, where the output waveguide 1303 includes a waveguide core 1320 and bounded and defined by a pair of light confining regions 1305. It may be understood that when light propagates through the output waveguide 1303, the light is propagating through the waveguide core 1320. The diffractive grating 1355 may receive light propagating through the slab waveguide 1315. The output light propagating through the diffractive grating 1355 may produce different orders of light (e.g., zeroth order, first order, second order, etc.). In some embodiments, the first orders of light may occur on either side of the zeroth order and may appear when the path light of light from the other gratings is equal to approximately one wavelength of light. In some embodiments, if more than one wavelength of light is received by the diffraction grating 1355, then the output light may be resolved into different wavelengths.

Figure 14:
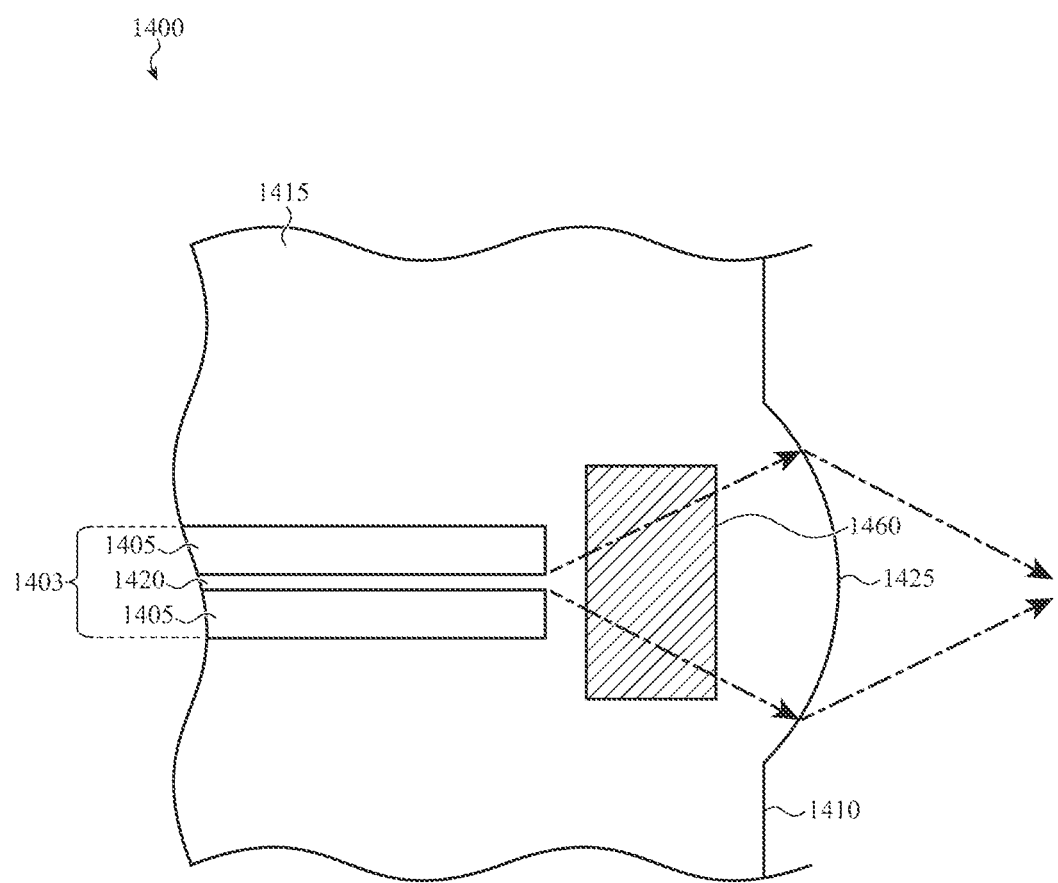
FIG. 14 shows a top view of an example of an optical system with metal on the slab waveguide.

FIG. 14 is an example of an optical system 1400 with metal 1460 on the slab waveguide 1415. The metal 1460 may be deposited on the slab waveguide 1415 and may function as a polarizer. In some embodiments, the metal may be a planar metal layer. The light propagating through the waveguide core 1420 (which is defined and bounded by a pair of light confining regions 1405) of the output waveguide 1403 may be randomly polarized and the metal may absorb more of a first polarization over a second polarization. As a result, an output side 1410 of the slab waveguide 1415 may emit a beam of output light with a different relative polarization as compared to the input light carried by the output waveguide 1403.

In some embodiments, the light may include polarizations such as TE polarization and/or TM polarization. The metal 1460 may attenuate the TM polarization of light and pass the TE polarization of light or may attenuate the TE polarization of light and pass the TM polarization of light. As used herein, when the TE polarization of light passes, it may be understood to allow relatively more TE polarization to propagate through the polarizer than TM polarization. Similarly, when the TM polarization of light passes, it may be understood to allow relatively more TM polarization to propagate through the polarizer than TE polarization. In some examples, an absorption layer may be deposited on the slab waveguide 1415 and underneath the metal 1460. The absorption layer may reduce the loss of the selected polarization of light that passes. The terms "pass" and "attenuate" may be relative terms. In some examples, the term "pass" may indicate that, when a first polarization passes, more of the first polarization may pass through than the second polarization and vice versa. In some examples, the term "attenuate" may indicate that, when a second polarization is attenuated, more of the second polarization is attenuated than the first.

Although the metal 1460 is illustrated as rectangular, the metal may be deposited in any appropriate shape. In some embodiments, the metal 1460 may be deposited on the slab waveguide 1415, as well as extending over to the shape of the optical element 1425. In FIG. 14, the optical element 1425 is a positive lens depicted as a semi-circle and, in some examples, the metal may cover the area shown and extended over to cover the semi-circle shape as well.

Figure 15:
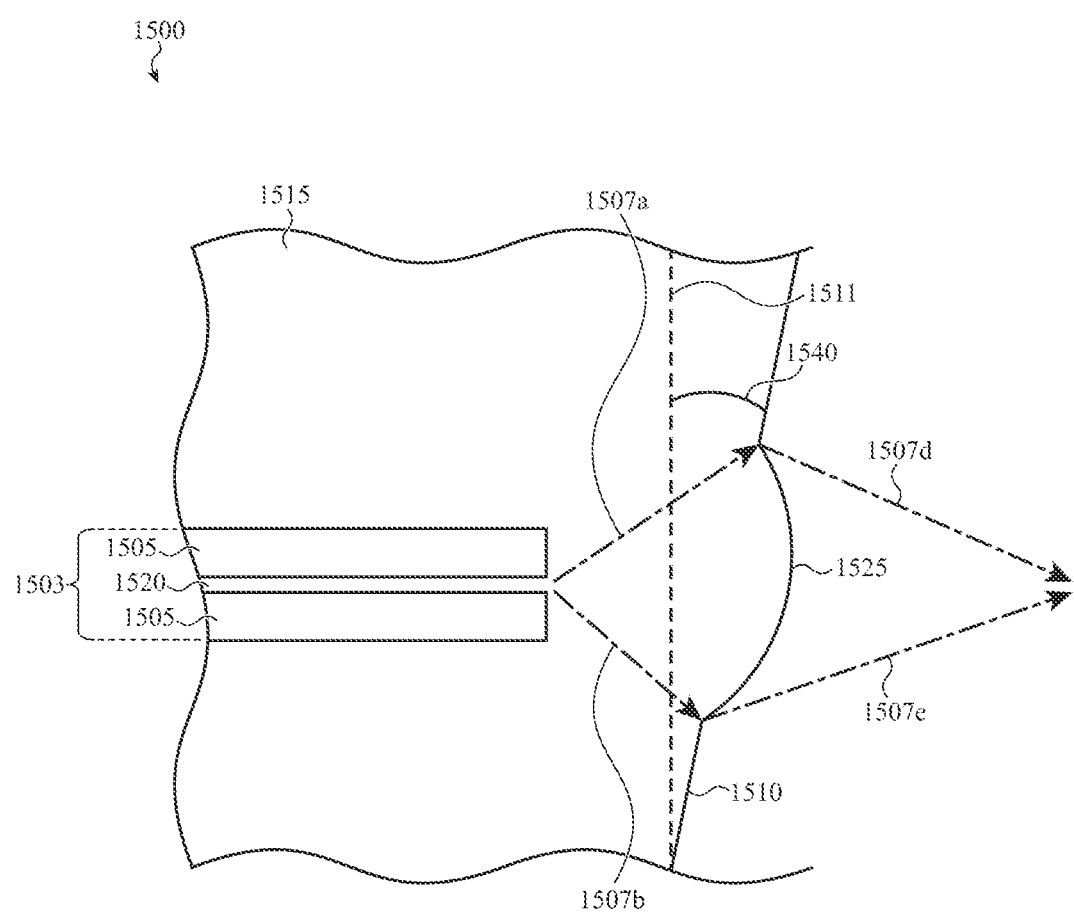
FIG. 15 shows a top view of an example of an optical system with an optical element in the angled output side.

FIG. 15 is an example of an optical system 1500 with an optical element 1525 in the angled output side 1510. FIG. 15 is an example of combining different embodiments described herein with reference to FIGS. 5 and 8. The output side 1510 may be angled with respect a plane 1511 normal to the end surface of the output waveguide 1503 (which includes a waveguide core 1520 bounded and defined by a pair of light confining regions 1505) where the output waveguide 1503 terminates into a slab waveguide 1515. The output side 1510 may be at an angle 1540 between the output side 1510 and plane 1511 (illustrated as a dashed line). Put another way, all of the light (the boundaries of which are represented by rays 1507a, 1507b) may pass through the optical element 1525 of the output side 1510 at an angle even though the output waveguide 1503 is not positioned at an angle as in FIG. 7. Output light (the boundaries of which are represented by rays 1507d, 1507e) may exit the optical element 1525. As previously described, the optical element 1525 may be any element described herein or any appropriate optical element to achieve the desired type of output light.

In some instances, it may be desirable for the photonic integrated circuits and optical systems described herein to be able to operate over a wide range of wavelengths. Depending on the intended use of a given optical system (e.g., performing spectroscopic measurements), a light source unit as described here may be configured to generate multiple wavelengths spanning tens or hundreds of nanometers, and the various optical components of the optical system may need to accommodate wavelengths spanning some or all of this range. In these instances, it is desirable for a given optical component to have a similar level of performance regardless of the wavelength of light it receives.

As mentioned previously, when an output waveguide terminates into a slab waveguide, the light will diffract as it enters the slab waveguide (which acts a free propagation region). The angle of diffraction for a given input light depends on the ratio between the wavelength and the mode size of the input light as it reaches the slab waveguide, which can result in different diffraction angles for different wavelengths of input light. This in turn may cause the beam size in the free propagation region to vary as a function of wavelength, which may result in wavelength-dependent variations in performance of the optical system.

To help reduce this wavelength dependency, the waveguide core of the output waveguide may be sized to be sufficiently narrow (e.g., via tapering) as it approaches the slab waveguide (e.g., the junction between the output waveguide and the slab waveguide), such that the size of the mode of the input light becomes proportional to the wavelength of the input light across the predetermined target range of wavelengths. Accordingly, when the output waveguide is configured to carry a target range of wavelengths, the width of the waveguide may be chosen based on this target range of wavelengths.

Narrowing the output waveguide in this manner may provide improved uniformity of the diffraction angle across the target range of wavelengths, but this may also increase back-reflections at the interface between the output waveguide and the slab waveguide. Specifically, narrowing the output waveguide may cause the mode of at least some of the wavelengths to be poorly confined, and thereby experience a change in effective refractive index between the light confining regions bounding the output waveguide and the slab waveguide. This change in effective refractive index creates back reflections at the junction between the output waveguide and the slab waveguide.

Figure 19A:
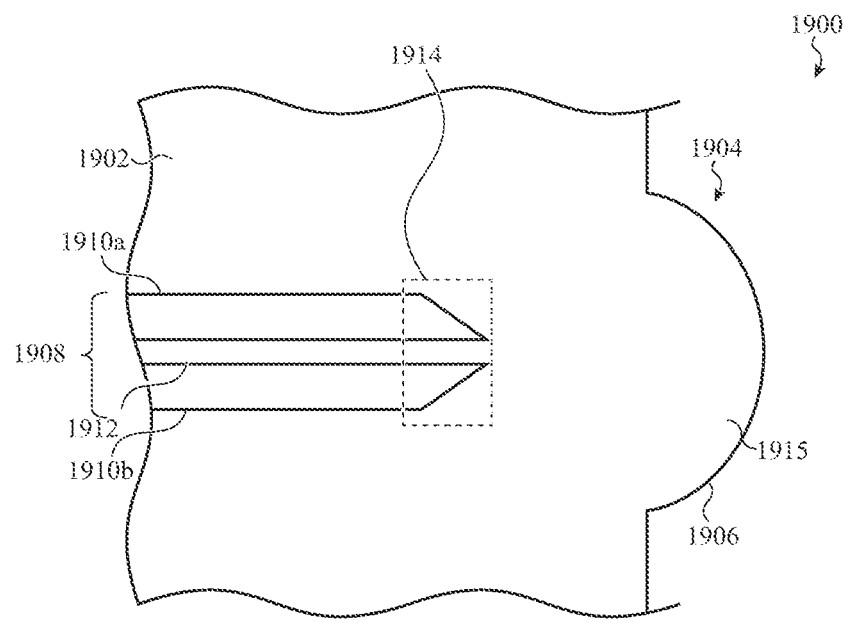
FIGS. 19A and 19B show top views of variations of photonic integrated circuits having output waveguides with index adjustment regions.

To help reduce these back-reflections, in some embodiments of the photonic integrated circuits and optical systems described herein, a junction between an output waveguide and slab waveguide may be configured to provide a varying effective refractive index before the output waveguide terminates. This may include varying the width of the waveguide core and/or light confining regions near the junction. For example, FIG. 19A shows an example of a photonic integrated circuit 1900 as described herein. While only a waveguide layer 1902 of the photonic integrated circuit 1900 is shown in FIG. 19A, the photonic integrated circuit 1900 may also include a substrate, a lower cladding layer, and optionally an upper cladding layer as discussed previously.

The photonic integrated circuit 1900 includes a side surface 1904, which acts as an output facet through which light may be emitted from the photonic integrated circuit 1900. In the variation shown in FIG. 19A, the side surface 1904 defines an optical element 1906 (which may be configured as any of the optical elements described previously). The photonic integrated circuit 1900 further includes an output waveguide 1908 and a slab waveguide 1915 defined in the waveguide layer 1902. Specifically, the output waveguide 1908 includes a waveguide core 1912 bounded and defined by a pair of light confining regions 1910a, 1910b. The pair of light confining regions includes a first light confining region 1910a and a second light confining region 1910b, each of which may be filled with a cladding material or air, as discussed previously, to provide optical confinement to the waveguide core 1912. The output waveguide 1908 terminates into the slab waveguide 1915 at a junction between the output waveguide 1908 and the slab waveguide 1915. Accordingly, input light (not shown) may be passed from the waveguide core 1912 to the slab waveguide 1915, and may exit the photonic integrated circuit 1900 via the side surface 1904 as described previously.

The output waveguide 1908 includes an index adjustment region 1914 positioned at the junction between the output waveguide 1908 and the slab waveguide 1915, such that a distal end the index adjustment region 1914 coincides with the junction between the output waveguide 1908 and the slab waveguide 1915. The index adjustment region 1914 is configured to change the effective refractive index experienced by light traveling through the output waveguide 1908 as it approaches the junction with the slab waveguide 1915. In the variation shown in FIG. 19A, the width of one or both of the light confining regions 1910a, 1910b narrows in the index adjustment region 1914 as it approaches the junction with the slab waveguide 1915 (i.e., decrease in a direction toward the junction). While the widths of one or both of the light confining regions 1910a, 1910b are shown in FIG. 19A as narrowing in the index adjustment region 1914, in other instances the width of only one of the light confining regions (i.e., either the first light confining region 1910a or the second light confining region 1910b) narrows in the index adjustment region 1914.

In the variation shown in FIG. 19A, the width of the waveguide core may remain constant within the index adjustment region 1914. Alternatively, the width of the waveguide core 1912 may narrow adiabatically within the index adjustment region 1914 as the waveguide core 1912 approaches the junction with the slab waveguide 1915 (i.e., in a direction toward the junction). In these instances, the change in width of the light confining regions 1910a, 1910b will spread the change in effective refractive index across the length of the index adjustment region 1914, which will reduce the instantaneous refractive index change experienced by light back-reflections associated with effective refractive index change as the output waveguide terminates. Additionally, the reduced width of the light confining regions 1910a, 1910b at the junction provides a narrower surface to receive back reflections generated at the side surface 1904. As a result, this back-reflected light is less likely to reflect off of the light confining regions 1910a, 1910b in a manner that ultimately results in this back-reflected light to coupling into the output waveguide 1908.

In the variation shown in FIG. 19A, the reduced width of the light confining regions 1910a, 1910b taper linearly in a direction toward the junction. While the widths are shown as tapering linearly to a width of zero, in other instances the widths may taper to a non-zero minimum width (which may depend, in part, on the manufacturing capabilities used to define the light confining regions 1910a, 1910b). In some of these variations, the widths of one or both of the light confining regions 1910a, 1910b taper non-adiabatically, such that the mode shape of input light carried by the waveguide core 1912 is unable to significantly change within the index adjustment region 1914. For example, while an adiabatic taper may take hundreds of microns to achieve a particular change in width of the light confining regions 1910a, 1910b, a non-adiabatic taper as described herein may achieve the same change in width over the length of a few microns or less.

Figure 19B:
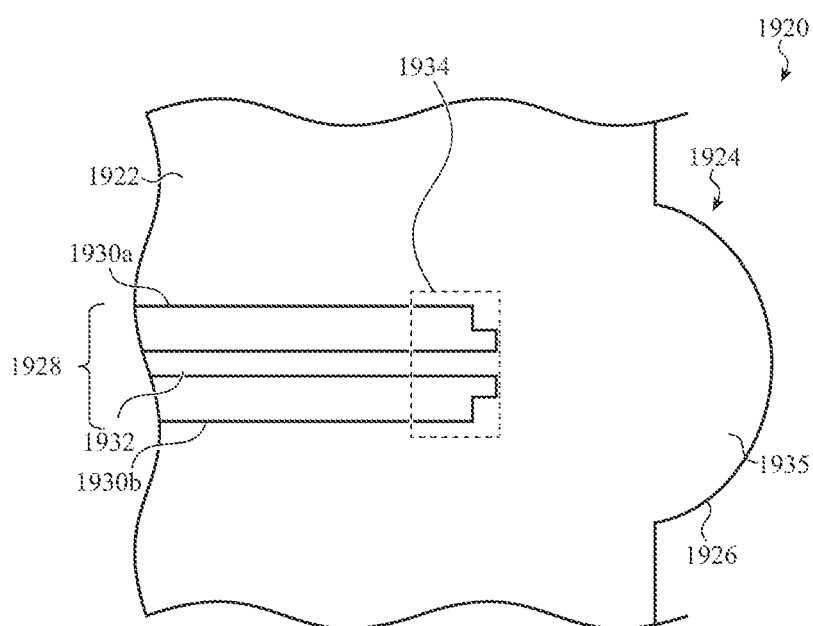

In other variations, the widths of the light confining regions 1910a, 1910b may narrow in a non-linear manner. FIG. 19B shows one such variation of an example of a photonic integrated circuit 1920 as described herein. While only a waveguide layer 1922 of the photonic integrated circuit 1920 is shown in FIG. 19B, the photonic integrated circuit 1920 may also include a substrate, a lower cladding layer, and optionally an upper cladding layer as discussed previously. The photonic integrated circuit 1920 includes an output waveguide 1928 including a waveguide core 1932 defined and bounded by first and second light confining regions 1930a, 1930b and a slab waveguide 1935 having a side surface 1924 that defines an optical element 1926. These components may be configured in the same manner as discussed herein with respect to FIG. 19A, except that the output waveguide 1928 has a different index adjustment region 1934.

The index adjustment region 1934 is positioned at the junction between the output waveguide 1928 and the slab waveguide 1935, such that a distal end the index adjustment region 1934 coincides with the junction between the output waveguide 1928 and the slab waveguide 1935. Within index adjustment region 1934, the widths of the light confining regions 1930a, 1930b are stepped. Specially, the width of each of the light confining regions 1930a, 1930b, changes from a first width to a narrower second width within the index adjustment region 1934 (i.e., before the output waveguide 1928 terminates at the junction with the slab waveguide 1935). In instances where the output waveguide is configured to carry a plurality of wavelengths across a target range of wavelengths, the length of the portion of the light confining regions 1930a, 1930b having the narrower second width may be selected to be one quarter of a wavelength of one of the wavelengths in the target range of wavelengths (e.g., a center wavelength within the target range of wavelengths). The width of the waveguide core 1932 may remain constant within the index adjustment region 1934. Alternatively, the width of the waveguide core 1932 may narrow adiabatically within the index adjustment region 1934 as the waveguide core 1932 approaches the junction with the slab waveguide 1935.

Figure 20A:
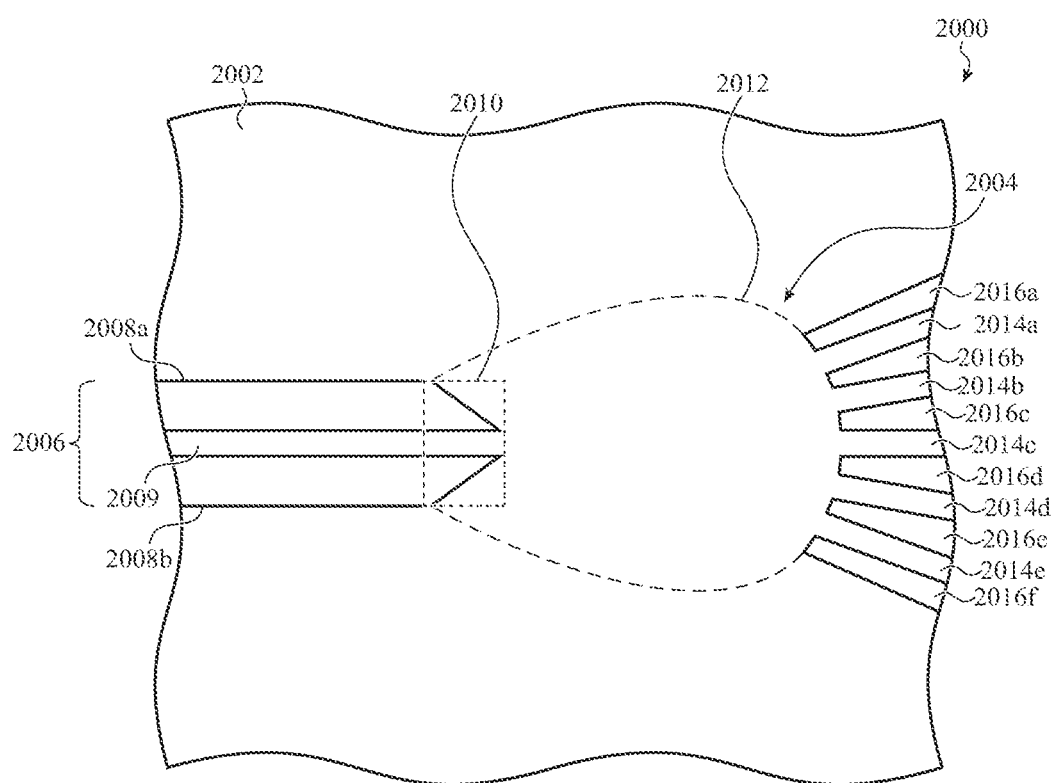
FIGS. 20A and 20B show top views of variations of photonic integrated circuits with optical splitters as described herein.

The index adjustment regions 1914 and 1934 described with respect to FIGS. 19A and 19B may be utilized in any optical component that includes a junction between an output waveguide and a slab waveguide. For example, FIG. 20A shows an example of a photonic integrated circuit 2000 as described herein. While only a waveguide layer 2002 of the photonic integrated circuit 2000 is shown in FIG. 20A, the photonic integrated circuit 2000 may also include a substrate, a lower cladding layer, and optionally an upper cladding layer as discussed previously. In this variation, the photonic integrated circuit 2000 includes an optical splitter 2004.

As shown, the waveguide layer includes an input waveguide 2006 that includes a waveguide core 2009 defined by light bounded and defined by a pair of light confining regions 2008a, 2008b. The input waveguide 2006 may be configured the same as the output waveguide 1908 of FIG. 19A, including an index adjustment region 2010 that is configured the same as the index adjustment region 1914 to reduce the width of each of the light confining regions 2008a, 2008b in the index adjustment region 2010 as it approaches the junction with a slab waveguide 2012.

The slab waveguide 2012 acts a free propagation region to optically couple the input waveguide 2006 to a plurality of output waveguides. Light introduced from the input waveguide 2006 into the slab waveguide 2012 will traverse the free propagation region to split the light between a plurality of output waveguides. While the boundary of slab waveguide 2012 is depicted in FIG. 20A as a dashed line, it should be appreciated that the actual boundary of the slab waveguide 2012 may be positioned at any portion of the waveguide layer 2002 that will not impact the operation of the optical splitter.

To define the plurality of output waveguides, the optical splitter 2004 includes a plurality of light confining regions 2016a-2016f and a plurality of waveguide cores 2014a-2014e. Each output waveguide is defined as one of the plurality of waveguide cores 2014a-2014e and a corresponding pair of light confining regions of the plurality of light confining regions 2016a-2016f. For example, a first waveguide core 2014a may be bounded and defined by a first light confining region 2016a and a second light confining region 2016b to form a first output waveguide, whereas a second waveguide core 2014b may be bounded and defined by a second light confining region 2016b and a third light confining region 2016c to form a second output waveguide. While the optical splitter 2004 is shown in FIG. 20A as having five output waveguides (i.e., one for each of the plurality of waveguide cores 2014a-2014e), it should be appreciated that the optical splitter 2004 may include any number of output waveguides as desired. Similarly, while these waveguide cores 2014a-2014e are shown in FIG. 20A as having the same thickness, it should be appreciated that different output waveguides may have waveguide cores with different widths. The optical splitters described herein may be configured to evenly or unevenly split light received from the input waveguide between the plurality of output waveguides as may be desired.

The index adjustment region 2010 may allow the input waveguide 2006 to be sufficiently narrow to improve the uniformity of diffraction angle (as a function of wavelength) as light enters the slab waveguide 2012, yet still reduce back-reflection at the junction between the input waveguide 2006 and the slab waveguide 2012. Overall, the optical splitter 2004 may have improved splitting performance across a range of wavelengths.

Figure 20B:
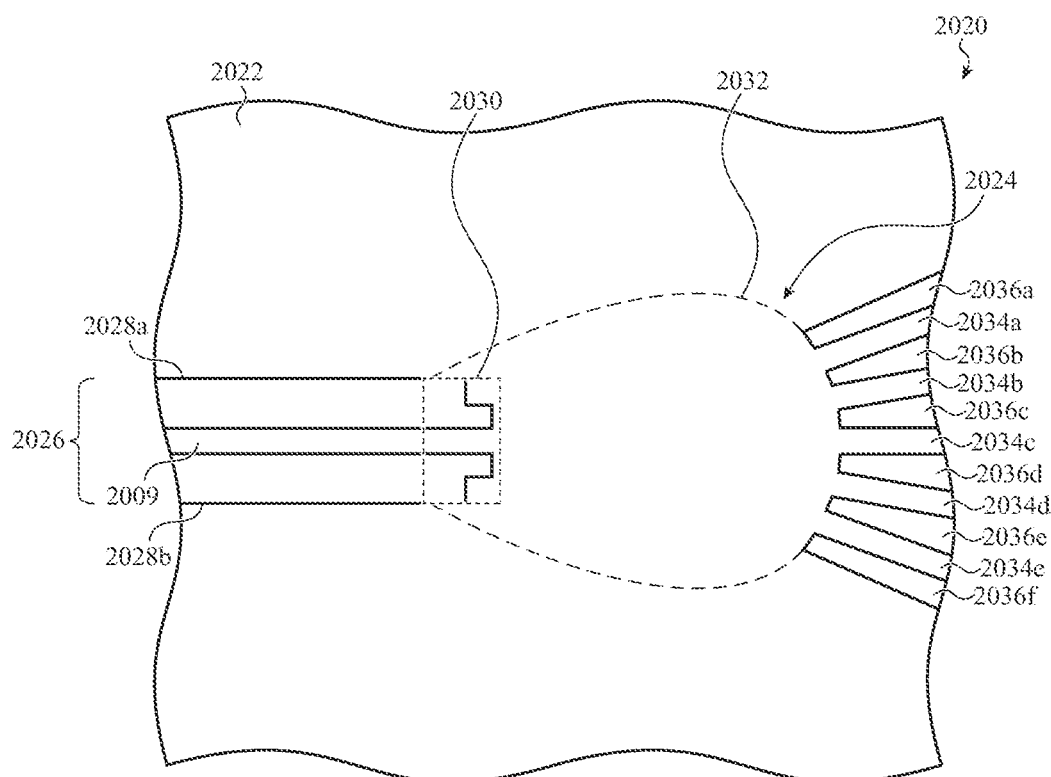

FIG. 20B shows one such variation of an example of a photonic integrated circuit 2020 as described herein. While only a waveguide layer 2022 of the photonic integrated circuit 2020 is shown in FIG. 20B, the photonic integrated circuit 2020 may also include a substrate, a lower cladding layer, and optionally an upper cladding layer as discussed previously. The photonic integrated circuit 2020 includes an optical splitter 2024 designed to split light introduced by an input waveguide 2026 into a slab waveguide 2032 between a plurality of output waveguides. As shown, the input waveguide 2026 includes a waveguide core 2009 defined and bounded by first and second light confining regions 2028a, 2028b. The waveguide layer 2022 includes a plurality of waveguide cores 2034a-2034e and a plurality of light confining regions 2036a-2036f that define the plurality of output waveguides These components may be configured in the same manner as discussed herein with respect to optical splitter 2004 of FIG. 20A, except that the output waveguide 2026 has a different index adjustment region 2030. This index adjustment region 2030 may be configured in the same manner as the index adjustment region 1934 described herein with respect to FIG. 19B. Specifically, the widths of the light confining regions 2028a, 2028b are stepped. Specially, the width of each of the light confining regions 2028a, 2028b, changes from a first width to a narrower second width within the index adjustment region 2030 (i.e., before the input waveguide 2026 terminates at the junction with the slab waveguide 2032).

Figure 21A:
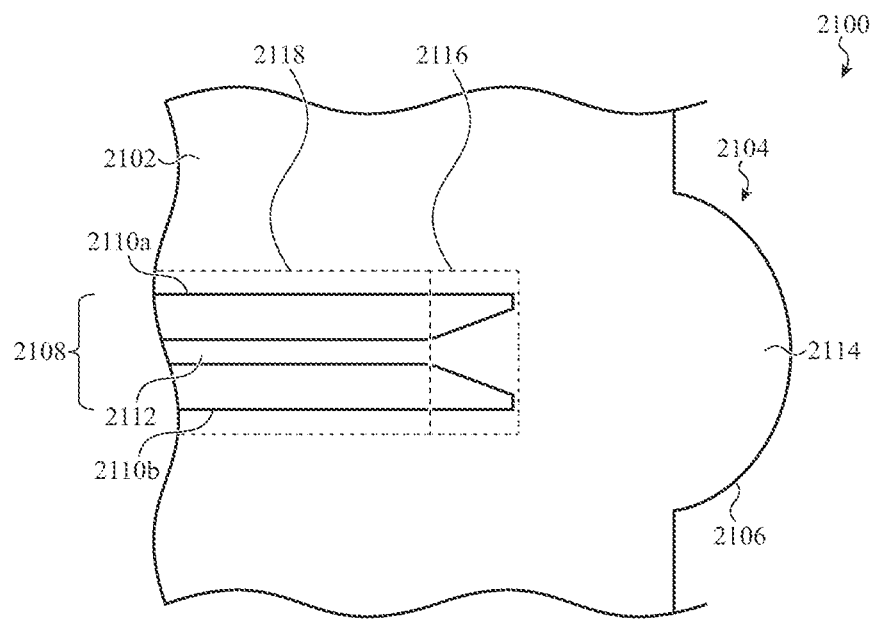
FIGS. 21A-21C show top views of variations of photonic integrated circuits having output waveguides with index adjustment regions.

In other variations, a waveguide may be configured such that the width of the waveguide core increases as it approaches the junction with a slab waveguide. For example, FIG. 21A shows an example of a photonic integrated circuit 2100 as described herein. While only a waveguide layer 2102 of the photonic integrated circuit 2100 is shown in FIG. 21A, the photonic integrated circuit 2100 may also include a substrate, a lower cladding layer, and optionally an upper cladding layer as discussed previously.

The photonic integrated circuit 2100 includes a side surface 2104, which acts as an output facet through which light may be emitted from the photonic integrated circuit 2100. In the variation shown in FIG. 21A, the side surface 2104 defines an optical element 2106 (which may be configured as any of the optical elements described previously). The photonic integrated circuit 2100 further includes an output waveguide 2108 and a slab waveguide 2114 defined in the waveguide layer 2102. Specifically, the output waveguide 2108 includes a waveguide core 2112 bounded and defined by a pair of light confining regions 2110a, 2110b. The pair of light confining regions includes a first light confining region 2110a and a second light confining region 2110b, each of which may be filled with a cladding material or air, as discussed previously, to provide optical confinement to the waveguide core 2112. The output waveguide 2108 terminates into the slab waveguide 2114 at a junction between the output waveguide 2108 and the slab waveguide 2114. Accordingly, input light (not shown) may be passed from the waveguide core 2112 to the slab waveguide 2114, and may exit the photonic integrated circuit 2100 via the side surface 2104 as described previously.

The output waveguide 2108 includes an index adjustment region 2116 that is configured to change the effective refractive index experienced by light traveling through the output waveguide 2108 as it approaches the junction with the slab waveguide 2114. The index adjustment region 2116 is positioned at the junction between the output waveguide 2108 and the slab waveguide 2114, such that a distal end the index adjustment region 2116 coincides with the junction between the output waveguide 2108 and the slab waveguide 2114. In the variation shown in FIG. 21A, the width of each of the light confining regions 2110a, 2110b narrows in the index adjustment region 2116 as it approaches the junction with the slab waveguide 2114. The width of the waveguide core 2112 increases within the index adjustment region 2116 as the width of the light confining regions 2110a, 2110b decreases. Whereas the light confining regions 1910a and 1910b shown in FIG. 19A taper toward waveguide core 1912 in output waveguide 1908, the light confining regions 2110a and 2110b shown in FIG. 21A taper away from the waveguide core 2112.

The increasing width of the waveguide core 2112 in the index adjustment region 2116 provides a more gradual effective refractive index transition as light travels from the output waveguide 2108 to the slab waveguide 2114, thereby reducing back reflections of light at the junction between the output waveguide 2108 and the slab waveguide 2114. Additionally, the width of the waveguide core 2112 increases non-adiabatically within the index adjustment region 2116. As a result, width increase does not significantly change the shape of the mode of light traveling through the index adjustment region 2116 of the waveguide core 2112. This allows the waveguide core 2112 to be sized to provide improved uniformity of the diffraction angle across the target range of wavelengths as described previously, while the non-adiabatic increase in the width of the waveguide core 2112 reduces back-reflections without significantly impacting this uniformity.

Specifically, the output waveguide 2108 includes an additional region 2118 connected to the index adjustment region 2116, such that the index adjustment region 2116 is positioned between the additional region 2118 and the slab waveguide 2114. In some variations, the additional region 2118 has a constant width, such that the width of the waveguide core 2112 is constant as it approaches the index adjustment region 2116. In some of these variations, the output waveguide 2108 further includes a third region (not shown) in which the width of the waveguide core 2112 narrows adiabatically. In this way, the third region may adiabatically taper the waveguide core 2112 from an initial width to a narrowed first width. The width of the waveguide core 2112 in the additional region 2118 will have the first width, and will increase non-adiabatically in the index adjustment region 2116 from the first width to a wider second width.

In other variations, the width of the waveguide core 2112 narrows adiabatically in the additional region 2118, such that the width of the waveguide core 2112 is narrowing as it reaches the index adjustment region 2116. In these instances, the width of the waveguide core 2112 may adiabatically taper in the additional region 2118 from an initial width to a narrower first width, and may increase non-adiabatically in the index adjustment region 2116 from the first width to a wider second width. It should be appreciated that the selection of the first width, the second width, as well as the length along which the waveguide core 2112 transitions between the first and second widths, may be selected as desired to obtain a particular balance of diffraction angle, uniformity of diffraction angle as a function of wavelength, and amount of back-reflected light at the junction between the output waveguide 2108 and the slab waveguide 2114.

Figure 21B:
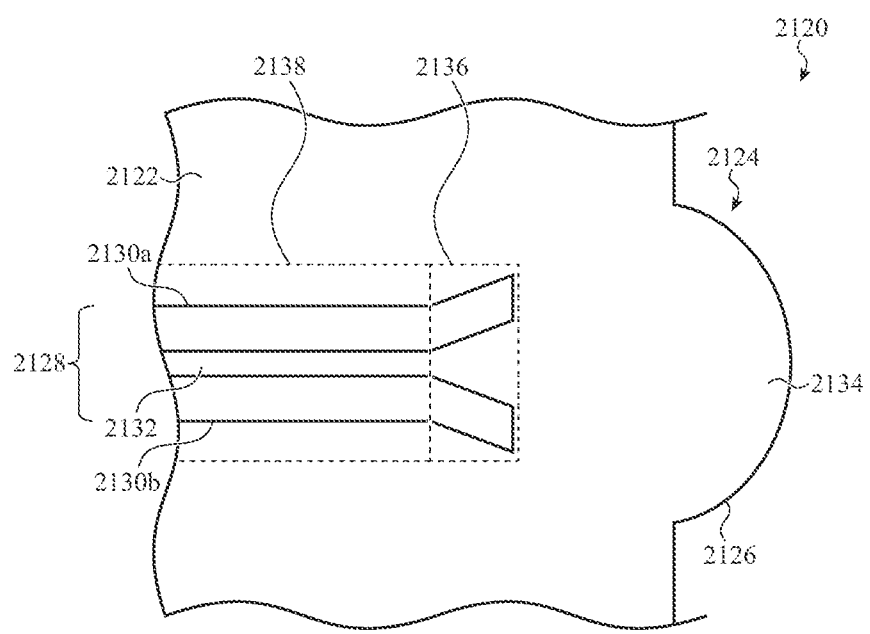

In other variations, the waveguide core of the output waveguide may increase without a corresponding decrease in the width of the light-confining regions bounding the output waveguide. For example, FIG. 21B shows one such variation of an example of a photonic integrated circuit 2120 as described herein. While only a waveguide layer 2122 of the photonic integrated circuit 2120 is shown in FIG. 21B, the photonic integrated circuit 2120 may also include a substrate, a lower cladding layer, and optionally an upper cladding layer as discussed previously. The photonic integrated circuit 2120 includes an output waveguide 2128 including a waveguide core 2132 defined and bounded by first and second light confining regions 2130a, 2130b and a slab waveguide 2134 having a side surface 2124 that defines an optical element 2126. The output waveguide 2128 includes an index adjustment region 2136 connected to an additional region 2138.

The photonic integrated circuit 2120 is otherwise configured as described herein with respect to the photonic integrated circuit 2100 of FIG. 21A, except for the index adjustment region 2136. The index adjustment region 2136 is positioned at the junction between the output waveguide 2128 and the slab waveguide 2134, such that a distal end the index adjustment region 2136 coincides with the junction between the output waveguide 2128 and the slab waveguide 2134. As shown there, while the width of the waveguide core 2132 increases from a first width to a wider second width within the index adjustment region 2136, the light confining regions 2130a, 2130b maintain a constant width within the index adjustment region 2136. Accordingly, the first and second light confining regions 2130a, 2130b are angled away from each other within the index adjustment region 2136.

Figure 21C:
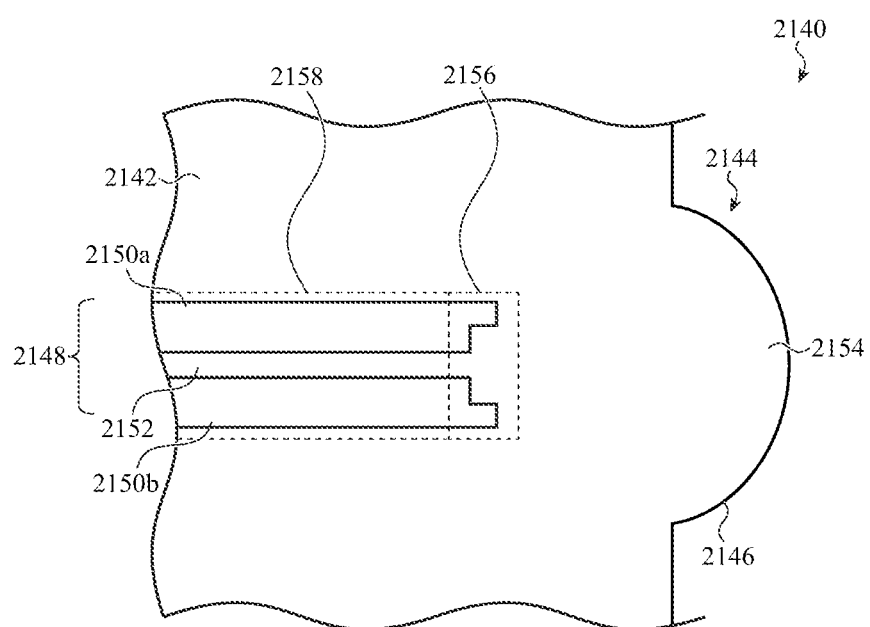

While the width of the waveguide cores 2112 and 2132 increase linearly within the index adjustment regions 2116 and 2136 in FIGS. 21A and 21B, in other instances the width of the waveguide core may increase in a non-linear manner. FIG. 21C shows one such variation of an example of a photonic integrated circuit 2140 as described herein. While only a waveguide layer 2142 of the photonic integrated circuit 2140 is shown in FIG. 21C, the photonic integrated circuit 2140 may also include a substrate, a lower cladding layer, and optionally an upper cladding layer as discussed previously. The photonic integrated circuit 2140 includes an output waveguide 2148 including a waveguide core 2152 defined and bounded by first and second light confining regions 2150a, 2150b and a slab waveguide 2154 having a side surface 2144 that defines an optical element 2146. The output waveguide 2148 includes an index adjustment region 2156 connected to an additional region 2158.

The photonic integrated circuit 2140 is otherwise configured as described herein with respect to FIG. 21A, except for the index adjustment region 2156. The index adjustment region 2156 is positioned at the junction between the output waveguide 2148 and the slab waveguide 2154, such that a distal end the index adjustment region 2156 coincides with the junction between the output waveguide 2148 and the slab waveguide 2154. Within index adjustment region 2156, the width of the waveguide core 2152 is stepped. Specifically, the width of the waveguide core 2152 increases from a first width to a wider second width within the index adjustment region 2156 (i.e., before the output waveguide 2148 terminates at the junction with the slab waveguide 2154). In some of these variations, the width of light confining regions 2150a, 2150b may decrease as the width of the waveguide core 2152 increases.

In instances where the output waveguide is configured to carry a plurality of wavelengths across a target range of wavelengths, the length of the portion of the waveguide core 2152 having the wider second width may be selected to be one quarter of a wavelength of one of the wavelengths in the target range of wavelengths (e.g., a center wavelength within the target range of wavelengths).

Figure 22A:
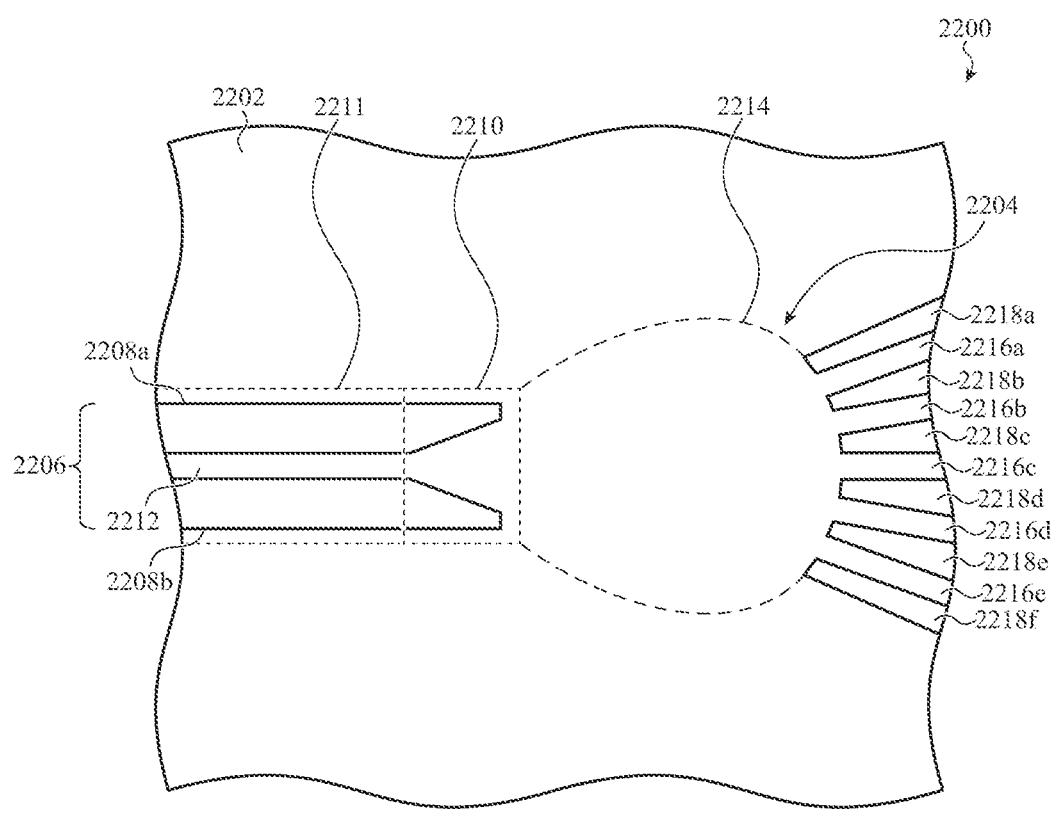
FIGS. 22A-22C show top views of variations of photonic integrated circuits with optical splitters as described herein.

The output waveguides 2108, 2128, and 2148 of FIGS. 21A-21C may instead be used as input waveguides for an optical splitter as described previously. For example, FIG. 22A shows a variation of a photonic integrated circuit 2200 that has a waveguide layer 2202 that defines an optical splitter 2204. The optical splitter 2204 includes a slab waveguide 2214 and a plurality of waveguide cores 2216a-2216e and light confining regions 2218a-2218f that form a plurality of output waveguides. The photonic integrated circuit 2200 is otherwise configured as described herein with respect to the photonic integrated circuit 2000 of FIG. 20A, except for the input waveguide 2206. In this variation, the input waveguide 2206 is configured the same as the output waveguide 2108 of FIG. 21A.

Specifically, the input waveguide 2206 includes a waveguide core 2212 bounded and defined by a pair of light confining regions 2208a, 2208b. The input waveguide 2206 includes an index adjustment region 2210 and an additional region 2211 connected to the index adjustment region 2210 as discussed previously. The width of each of the light confining regions 2108a, 2108b narrows in the index adjustment region 2210 as it approaches the junction with the slab waveguide 2214. Similarly the width of the waveguide core 2212 increases within the index adjustment region 2210 as the width of the light confining regions 2210a, 2210b decreases. The additional region 2211 may be configured the same as the additional region 2118 of FIG. 21A.

Figure 22B:
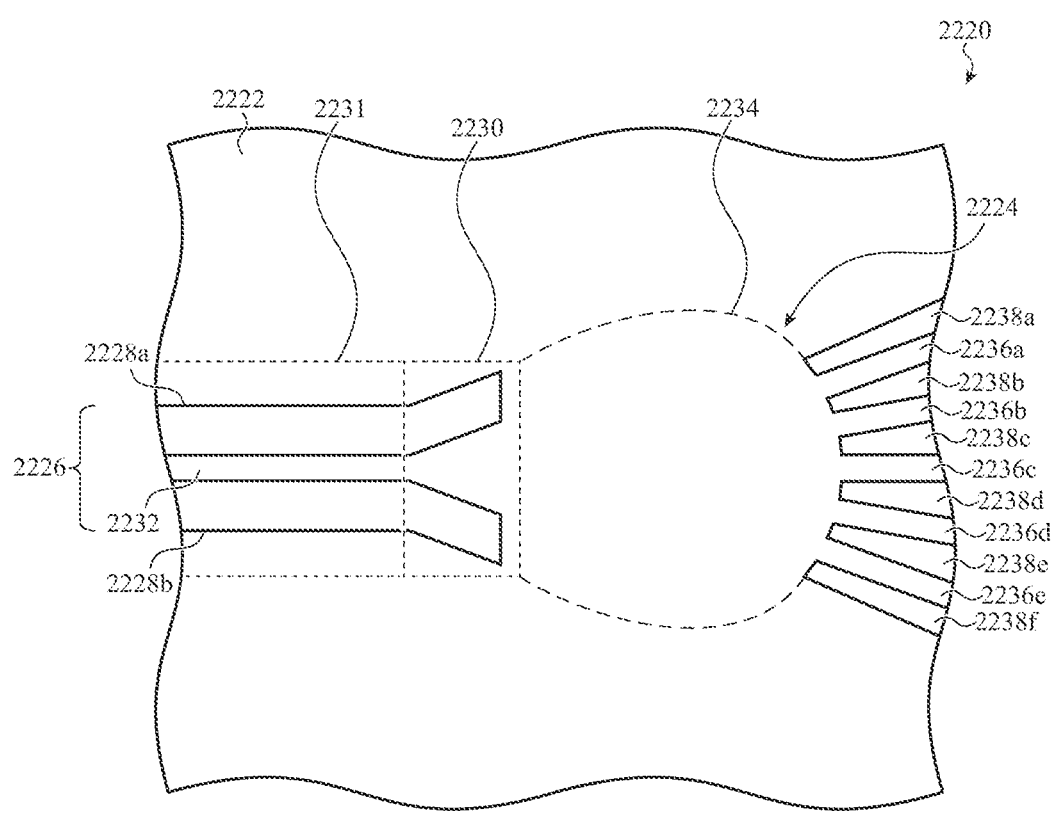

FIG. 22B shows another variation of a photonic integrated circuit 2220 that has a waveguide layer 2222 that defines an optical splitter 2224. The optical splitter 2224 includes a slab waveguide 2234 and a plurality of waveguide cores 2236a-2236e and light confining regions 2238a-2238f that form a plurality of output waveguides. The optical splitter 2224 includes an input waveguide 2226 having a waveguide core 2232 defined and bounded by a pair of light confining regions 2228a, 2228b. The input waveguide 2226 includes an additional region 2231 connected to an index transition region 2230 as described previously. The photonic integrated circuit 2220 is configured as described herein with respect to the photonic integrated circuit 2200 of FIG. 22A, except for the index transition region 2230. In this variation, the index transition region 2230 is configured the same as the output waveguide 2128 of FIG. 21B. As shown there, while the width of the waveguide core 2232 increases from a first width to a wider second width within the index adjustment region 2230, the light confining regions 2228a, 2228b maintain a constant width within the index adjustment region 2230. Accordingly, the first and second light confining regions 2228a, 2228b are angled away from each other within the index adjustment region 2230.

Figure 22C:
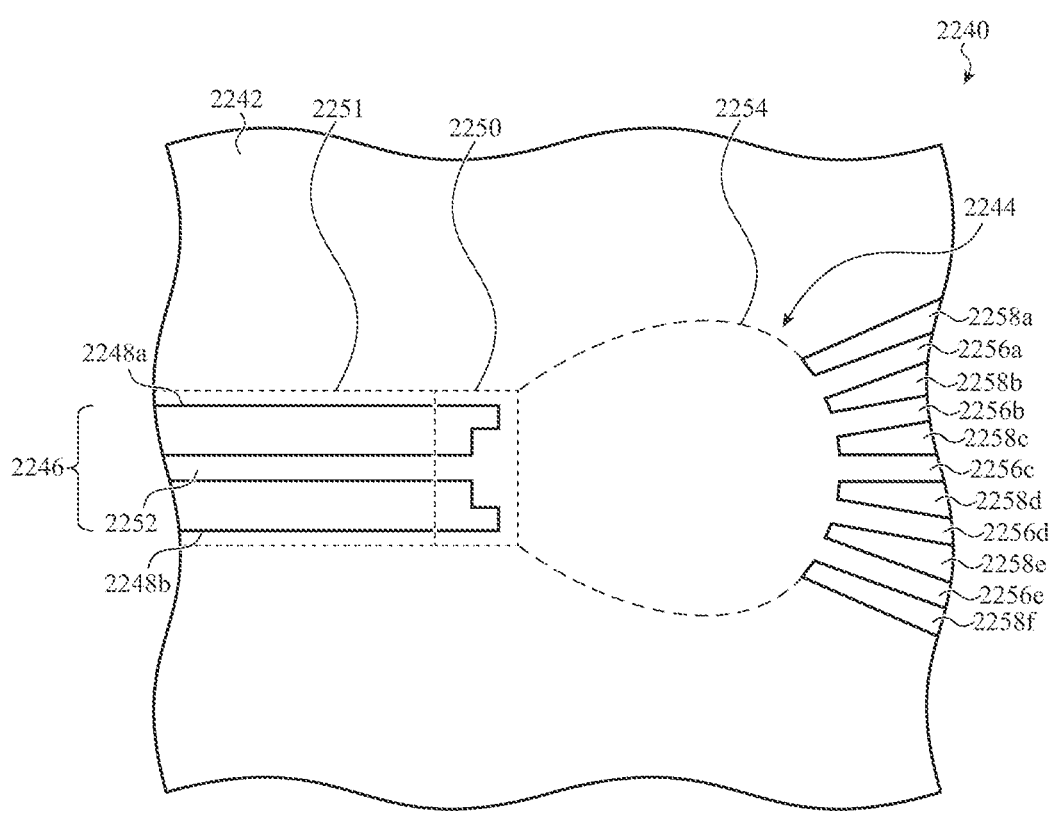

FIG. 22C shows another variation of a photonic integrated circuit 2240 that has a waveguide layer 2242 that defines an optical splitter 2244. The optical splitter 2244 includes a slab waveguide 2254 and a plurality of waveguide cores 2256a-2256e and light confining regions 2258a-2258f that form a plurality of output waveguides. The optical splitter 2244 includes an input waveguide 2246 having a waveguide core 2252 defined and bounded by a pair of light confining regions 2248a, 2248b. The input waveguide 2246 includes an additional region 2251 connected to an index transition region 2250 as described previously. The photonic integrated circuit 2240 is configured as described herein with respect to the photonic integrated circuit 2200 of FIG. 22A, except for the index transition region 2250. In this variation, the index transition region 2250 is configured the same as the output waveguide 2148 of FIG. 21C. Specifically, the width of the waveguide core 2252 increases in a stepped manner from a first width to a wider second width within the index adjustment region 2250, as discussed previously.

It should be appreciated that for each of the embodiments described herein with respect to FIGS. 19A-22C, the various dimensions of the index transition regions may be selected to achieve a desired balance of diffraction angle, uniformity of diffraction angle as a function of wavelength, and amount of back-reflected light as described previously. Additionally, it should be appreciated that the index transition regions described with respect to FIGS. 19A-22C herein may be applied to any of the embodiments described herein with respect to FIGS. 2-18D, as well as any other optical component that includes a transition from a waveguide (e.g., a strip waveguide, rib waveguide, or the like) and a slab waveguide, such as an optical multiplexer, optical demultiplexer, or the like.

Although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:
1. A photonic integrated circuit, comprising:
a substrate;
a cladding layer; and
a waveguide layer comprising:
 a slab waveguide; and
 a waveguide comprising:
  a first light confining region;
  a second light confining region; and
  a waveguide core positioned between the first light confining region and the second light confining region; wherein:
the waveguide terminates into the slab waveguide at a junction between the waveguide and the slab waveguide; and
the waveguide comprises an index adjustment region positioned at the junction in which widths of one or both of the first light confining region and the second light confining region decrease in a direction toward the junction.

2. The photonic integrated circuit of claim 1, wherein the waveguide layer comprises:
an optical splitter comprising:
the slab waveguide;
the waveguide; and
a plurality of output waveguides, wherein:
the optical splitter is configured such that input light introduced into the slab waveguide from the waveguide is split between the plurality of output waveguides.

3. The photonic integrated circuit of claim 2, wherein:
the waveguide layer comprises a side surface that defines an optical element; and
the waveguide is positioned such that the input light introduced from the waveguide into the slab waveguide exits the photonic integrated circuit through the side surface.

4. The photonic integrated circuit of claim 3, wherein:
the optical element forms an on-chip lens.

5. The photonic integrated circuit of claim 3, wherein:
the optical element comprises a diffraction grating.

6. The photonic integrated circuit of claim 1, wherein:
a width of the waveguide core is constant in the index adjustment region.

7. The photonic integrated circuit of claim 1, wherein:
a width of the waveguide core narrows adiabatically in the index adjustment region in a direction toward the junction.

8. The photonic integrated circuit of claim 1, wherein:
a width of the waveguide core increases non-adiabatically in the index adjustment region in a direction toward the junction.

9. The photonic integrated circuit of the claim 1, wherein:
widths of one or both of the first light confining region and the second light confining region decrease linearly in a direction toward the junction.

10. A photonic integrated circuit, comprising:
a substrate;
a cladding layer; and
a waveguide layer comprising:
a slab waveguide; and
a waveguide comprising:
a first light confining region;
a second light confining region; and
a waveguide core positioned between the first light confining region and the second light confining region; wherein:
the waveguide terminates into the slab waveguide at a junction between the waveguide and the slab waveguide; and
the waveguide comprises an index adjustment region positioned at the junction in which a width of the waveguide core increases in a direction toward the junction.

11. The photonic integrated circuit of claim 10, wherein the waveguide layer comprises:
an optical splitter comprising:
the slab waveguide;
the waveguide; and
a plurality of output waveguides, wherein:
the optical splitter is configured such that input light introduced into the slab waveguide from the waveguide is split between the plurality of output waveguides.

12. The photonic integrated circuit of claim 10, wherein:
the waveguide layer comprises a side surface that defines an optical element; and
the waveguide is positioned such that input light introduced from the waveguide into the slab waveguide exits the photonic integrated circuit through the side surface.

13. The photonic integrated circuit of claim 12, wherein:
the optical element forms an on-chip lens.

14. The photonic integrated circuit of claim 10, wherein:
the width of the waveguide core increases non-adiabatically in the index adjustment region.

15. The photonic integrated of circuit of claim 10, wherein:
widths of the first light confining region and the second light confining regions are constant in the index adjustment region.

16. The photonic integrated circuit of claim 10, wherein:
the waveguide comprises an additional region in which the width of the waveguide core narrows adiabatically in a direction toward the junction; and
the index adjustment region is positioned between the additional region and the junction.

17. The photonic integrated circuit of claim 10, wherein the width of the waveguide core increases linearly in the index adjustment region.

18. An optical system comprising:
a light source unit configured to generate a set of wavelengths within a target wavelength range; and
a photonic integrated circuit: comprising:
a substrate;
a cladding layer; and
a waveguide layer comprising:
a slab waveguide; and
a waveguide comprising:
a first light confining region;
a second light confining region; and
a waveguide core positioned between the first light confining region and the second light confining region; wherein:
the waveguide terminates into the slab waveguide at a junction between the waveguide and the slab waveguide; and
the waveguide comprises an index adjustment region positioned in which widths of each the first light confining region and the second light confining region narrow from a first width to a second width in a direction toward the junction.

19. The optical system of claim 18, wherein:
a portion of each of the first light confining region and the second light confining region having the second width has a length; and
the length is one quarter of a wavelength within the target wavelength range.

20. The optical system of claim 18, wherein:
a width of the waveguide core increases from a third width to a fourth width in the index adjustment region.

* * * * *